(12) United States Patent
Yoshiura

(10) Patent No.: US 6,356,719 B1
(45) Date of Patent: Mar. 12, 2002

(54) IMAGE FORMING DEVICE

(75) Inventor: Syoichiro Yoshiura, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/274,980

(22) Filed: Mar. 23, 1999

(30) Foreign Application Priority Data

Mar. 23, 1998 (JP) .......................................... 10-073970

(51) Int. Cl.[7] .......................... G03G 15/00; G03B 27/52
(52) U.S. Cl. ........................... 399/45; 399/81; 399/391; 355/40
(58) Field of Search ............................ 355/40; 399/42, 399/45, 81, 82, 85, 86, 370, 376, 389, 391

(56) References Cited

U.S. PATENT DOCUMENTS

| | | | | |
|---|---|---|---|---|
| 5,229,814 A | * | 7/1993 | Hube et al. ................... | 399/14 |
| 5,446,524 A | * | 8/1995 | Koike .......................... | 399/45 |
| 5,621,541 A | * | 4/1997 | Sakai et al. ................. | 358/407 |
| 5,950,045 A | * | 9/1999 | Nomura et al. ............... | 399/81 |
| 5,969,826 A | * | 10/1999 | Dash et al. .................. | 358/400 |
| 5,974,284 A | * | 10/1999 | Sato et al. ................... | 399/76 |
| 6,118,972 A | * | 9/2000 | Yamazaki et al. ........... | 399/370 |
| 6,169,863 B1 | * | 1/2001 | Osari et al. .................. | 399/82 |

FOREIGN PATENT DOCUMENTS

| | | |
|---|---|---|
| JP | 6373751 | 5/1988 |
| JP | 4195074 | 7/1992 |
| JP | 4255872 | 9/1992 |

* cited by examiner

*Primary Examiner*—Russell Adams
*Assistant Examiner*—Rodney Fuller

(57) ABSTRACT

An image forming device is a digital composite machine which provides a plurality of image input modes in which image information is inputted in different forms, respectively. The image forming device is provided with (1) feed devices for supplying a plurality of types of recording materials, (2) a display device for displaying information regarding recording materials which are ready to be fed from the feed devices, (3) mode keys for selecting one from among the plurality of image input modes, (4) selecting keys for selecting one recording material on which image information is to be recorded, from among the recording materials displayed by the display device, (5) a recording section for recording image information inputted in the mode selected through the mode keys, onto the recording material selected through the selecting keys, and (6) a CPU for determining information regarding the recording materials to be displayed by the display section, depending on the mode selected. This arrangement ensures that the image forming device is capable of recording for reproduction of inputted images on suitable recording materials, selecting recording materials so as to be suitable to the input modes, respectively, and at every mode setting, displaying and selecting information regarding suitable recording materials in appropriate forms.

12 Claims, 24 Drawing Sheets

FIG. 19

| | SIZE | ORIENTATION | PAPER TYPE | REMAIN |
|---|---|---|---|---|
| T1 | A4 | LANDSCAPE | STANDARD | 4 |
| T2 | A3 | PORTRAIT | STANDARD | 3 |
| T3 | B4 | PORTRAIT | STANDARD | 2 |
| T4 | B5 | LANDSCAPE | STANDARD | 1 |
| T5 | A4 | PORTRAIT | THICK | 0 |
| T6 | A4 | LANDSCAPE | STANDARD | 4 |
| MANUAL FEED | A4 | PORTRAIT | — | — |

| | | | |
|---|---|---|---|
| COPY | ○ | — | ○ |
| FACSIMILE | ○ | — | — |
| PRINTER | ○ | ○ | — |

FIG. 22

|  | T1 | T2 | T3 | T4 | T5 | T6 | MANUAL FEED |
|---|---|---|---|---|---|---|---|
| COPY | ◯ | ◯ | ◯ | ◯ | — | ◯ | ◯ |
| FACSIMILE | ◯ | ◯ | ◯ | ◯ | — | ◯ | — |
| PRINTER | ◯ | ◯ | ◯ | ◯ | ◯ | ◯ | ◯ |

PAPER CHARACTERISTICS SETTING SCREEN — 700

| TRAY | SIZE | CHARACTERISTICS |
|---|---|---|
| TRAY 1 | A3  A4 | OHP |
| TRAY 2 | B4  B5 | THICK |
| TRAY 3 | POSTCARD | THIN |
| TRAY 4 | ENVELOPE | LOGO MARK |

821 — TRAY
822 — SIZE
823 — CHARACTERISTICS
824 — OK

IMAGE FORMING DEVICE

FIELD OF THE INVENTION

The present invention relates to an image forming device, such as a digital composite machine (digital copying machine) or the like, which provides a plurality of image input modes including a copy mode, a facsimile mode, and a printer mode and is equipped with recording material supply means for supplying recording materials of a plurality of types so that image information inputted in respective image input modes is recorded on the recording materials. More specifically, the present invention relates to the foregoing image forming device which is further arranged so as to be capable of keeping information of recording materials such as sizes and characteristics thereof under control so that a recording material suitable to the image input mode, whichever the input mode is, is selected as the recording material on which image information is to be recorded.

BACKGROUND OF THE INVENTION

A conventional image forming device, for example, a digital copying machine, provides various input/output modes including a copy mode, a printer mode, a facsimile mode, and the like. In the copy mode, one selected from among various image processing functions is carried out with respect to an image of an original supplied from a scanner section, and an image obtained by the image processing is outputted from a printer section. In the printer mode, image information transferred from an external image information processing device (personal computer or the like) so as to be outputted is outputted from the printer section. In the facsimile mode, an image transmitted from an external facsimile machine which is connected thereto through communication lines is expanded and outputted as an image by the printer section.

Regarding such a digital copying machine, there has been known such a digital copying machine as arranged so that, in order that image information inputted in any input mode can be recorded for reproduction, the copying machine stores in its paper feed section recording materials having various characteristics suitable to the respective input modes, and a display device thereof displays the characteristics and sizes of the recording materials stored in the paper feed section. Such a display device is disclosed by the Japanese Publication for Laid-Open Utility Model Application No. 73751/1988 (Jitsukaisho 63-73751).

According to the foregoing publication, information sources (for example, shielding plates) placed in a feed cassette, which are set in accordance with paper characteristics of copy paper, are detected by two w sensors, and the material of the copy paper stored w therein, for example, whether the copy paper is plane paper or groundwood paper, are judged on the basis of the detection results. The judgement results, together with the paper size of the copy paper, are displayed as copy paper information on a display panel of the copying machine.

As described above, since the display device of the copying machine disclosed in the foregoing Jitsukaisho 63-73751 is arranged so that judgment results of the material of the copy paper, together with the size of the copy paper, is displayed on the display panel of the copying machine as copy paper information, a user is allowed to select paper by ascertaining the copy paper size and information displayed on the display panel. Therefore, the user can confirm types of paper, such as plain paper, groundwood paper, and intermediate paper by seeing the display panel, and hence, does not have to take a look at paper per se stored in the feed cassette with the eye. Thus, the foregoing device is effective in the aspect that the user can easily select appropriate paper.

However, a copying machine equipped with such a display panel (input device, display device) as disclosed in the foregoing publication has drawbacks in that it does not always have displayed contents easily understood, and in that it does not always have good operability.

To be more specific, as described above, recently has been commercialized a digital copying machine providing not only the copy mode for functioning as a normal copying machine, but also an image input/output mode (input/output function), for example, the printer mode, and the facsimile mode, in which an image transferred from an external image information generating device (image information processing device) such as a personal computer or a facsimile machine is recorded for reproduction.

Such a digital copying machine is arranged so that a plurality of types of recording paper with various characteristics (paper characteristics) suitable to respective image input modes are prepared in a plurality of paper feed sections inside the copying machine, and in some image input mode, there have arise such problems as that image information is recorded on recording paper which is not suitable to recording the information, and as that it cannot be easily ascertained whether or not the recording paper prepared in the paper feed sections is suitable to the image input mode selected.

In the case where a composite machine (digital copying machine) is used as a printer particularly, recording paper of common use (plain paper) as well as specific recording materials with various characteristics such as cardboard, envelope, label sheets, paper with logomarks, and paper in various types of formats are to be prepared in paper feed sections (paper feed trays).

In the copy mode or the facsimile mode, in the case where special paper which is in an appropriate size but has different characteristics from usual standard recording paper is set in the tray of one of the paper feed sections, selection of the paper feed section is not carried out based on information about the recording paper, although the information can be checked on the selection screen. Therefore, such a trouble as follows occurs: in the case where the operator makes an error during the operation, images are recorded on special types of recording paper unsuitable to copy or facsimile.

SUMMARY OF THE INVENTION

An object of the present invention is to provide an image forming device capable of providing a plurality of image input modes, such as a composite machine (digital copying machine) capable of functioning as a copying machine, a facsimile machine, and a printer, which is characterized in that input images are recorded for reproduction on recording materials suitable for the image input mode selected.

Another object of the present invention is to provide an image forming device which is the foregoing composite machine further characterized by being capable of selecting recording materials suitable for the input modes, respectively, and at every mode setting, displaying and selecting information of recording materials suitable for the set mode.

Still another object of the present invention is to provide an image forming device capable of setting display information regarding recording materials in advance and controlling displayed information, so that image information is recorded on suitable recording materials in any input mode.

To achieve the aforementioned objects, an image forming device of the present invention is characterized by including (1) a plurality of image input sections for inputting image information, the image input sections inputting image information in different forms, respectively, (2) recording material supply sections for supplying recording materials of a plurality of types, (3) a recording material information display section for displaying information regarding recording materials which are ready to be fed from the recording material supply sections, (4) an input selecting section for selecting one image input section from among the plural image input sections, (5) a recording material selecting section for selecting one recording material on which image information is to be recorded, from among the recording materials the information of which is displayed by the recording material information display section, (6) a recording section for recording image information inputted by the image input section selected, onto the recording material selected by the recording material selecting section, and (7) a control section for determining information regarding the recording materials to be displayed by the recording material information display section, depending on the image input section selected.

With the foregoing arrangement, since there is provided the control section for determining information regarding the recording materials to be displayed by the recording material information display section depending on the image input section selected, display of information regarding recording materials is carried out in an appropriate manner depending on the image input section. Accordingly, the information regarding the recording materials corresponding to the image input section is surely conveyed to the user. Therefore, the user is allowed to select the recording material on which images are to be formed, by ascertaining the information regarding the recording materials corresponding to the image input section. As a result, such an error that a recording material unsuitable for the image input section selected is erroneously selected by the user and images are recorded thereon can be avoided.

Furthermore, it is preferable that the foregoing control section, by, for example, making only information regarding recording materials suitable for recording inputted image information be displayed on the recording material information display section, controls the recording material selecting section so that the recording materials suitable for recording the inputted image information are available for selection by the recording material selecting section.

With the foregoing arrangement, in the case where recording materials with various characteristics are prepared in the recording material supply sections in a state ready for feed, they become not available for selection. Therefore, such an error that a recording material unsuitable for the image input section selected is erroneously selected by the user and images are recorded thereon can be surely avoided.

To achieve the aforementioned objects, another image forming device of the present invention is an image forming device, which is functional in a plurality of image input modes in which image information is inputted in different forms, respectively, and is characterized by including (1) an input selecting section for selecting one image input mode from among the plural image input modes, (2) recording material supply sections for supplying recording materials of a plurality of types for recording image information, (3) a recording material selecting section for selecting a recording material to be supplied by the recording material supply sections, (4) a recording section for recording image information inputted in the image input mode selected by the input selecting section, onto the recording material selected by the recording material selecting section, and (5) a control section for controlling the recording material selecting section so that only recording materials suitable for the image input mode selected are available for selection.

With the foregoing arrangement wherein there is provided the control section which controls so that only recording materials suitable for the image input mode selected are available for selection, in the case where recording materials with various characteristics are prepared in the recording material supply sections in a state ready for feed, they become not available for selection. Therefore, such an error that a recording material unsuitable for the image input mode selected is erroneously selected by the user can be surely avoided.

For a fuller understanding of the nature and advantages of the invention, reference should be made to the ensuing detailed description taken in conjunction with the accompanying drawings.

BRIEF DESCRIPTION OF THE DRAWINGS

FIG. 19 is an explanatory view illustrating relationship between feed sections and paper information on a paper managing table in accordance with the embodiment of the present invention.

FIG. 22 is an explanatory view illustrating a managing table in accordance with another embodiment of the present invention.

FIG. 24 is a view for explaining a characteristic setting screen, in accordance with the embodiment of the present invention.

DESCRIPTION OF THE PREFERRED EMBODIMENTS

The following description will explain a digital copying machine as an embodiment of an image forming device in accordance with the present invention, while referring to FIGS. 1 through 24.

The digital copying machine is a digital image forming device to which image information in a plurality of different forms, such as copy mode, printer mode, and facsimile mode, can be inputted.

Figure 1:
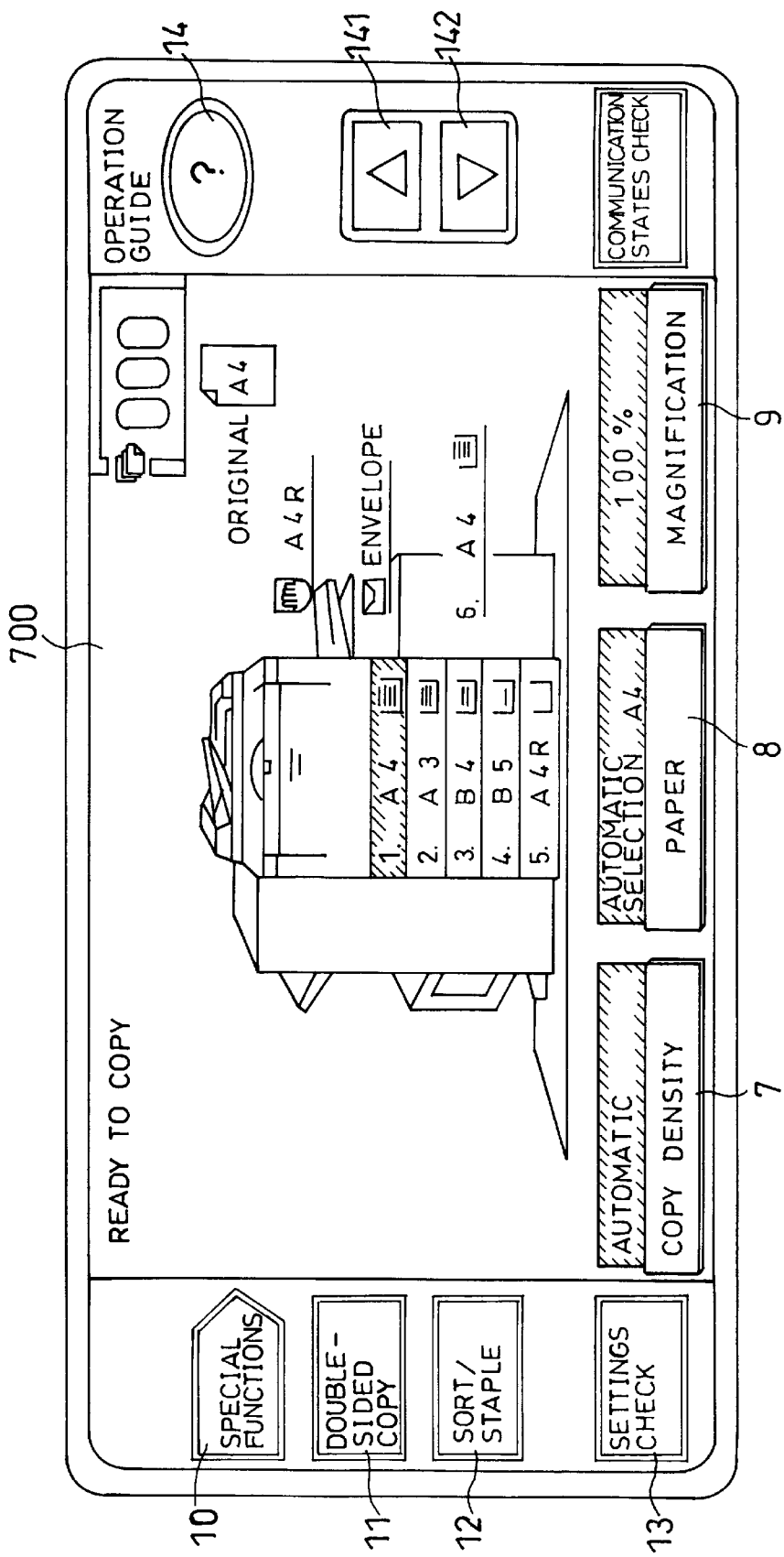
FIG. 1 is an enlarged view of a liquid crystal touch panel, i.e., a principal part of an operation panel in accordance with an embodiment of the present invention.
Figure 2:
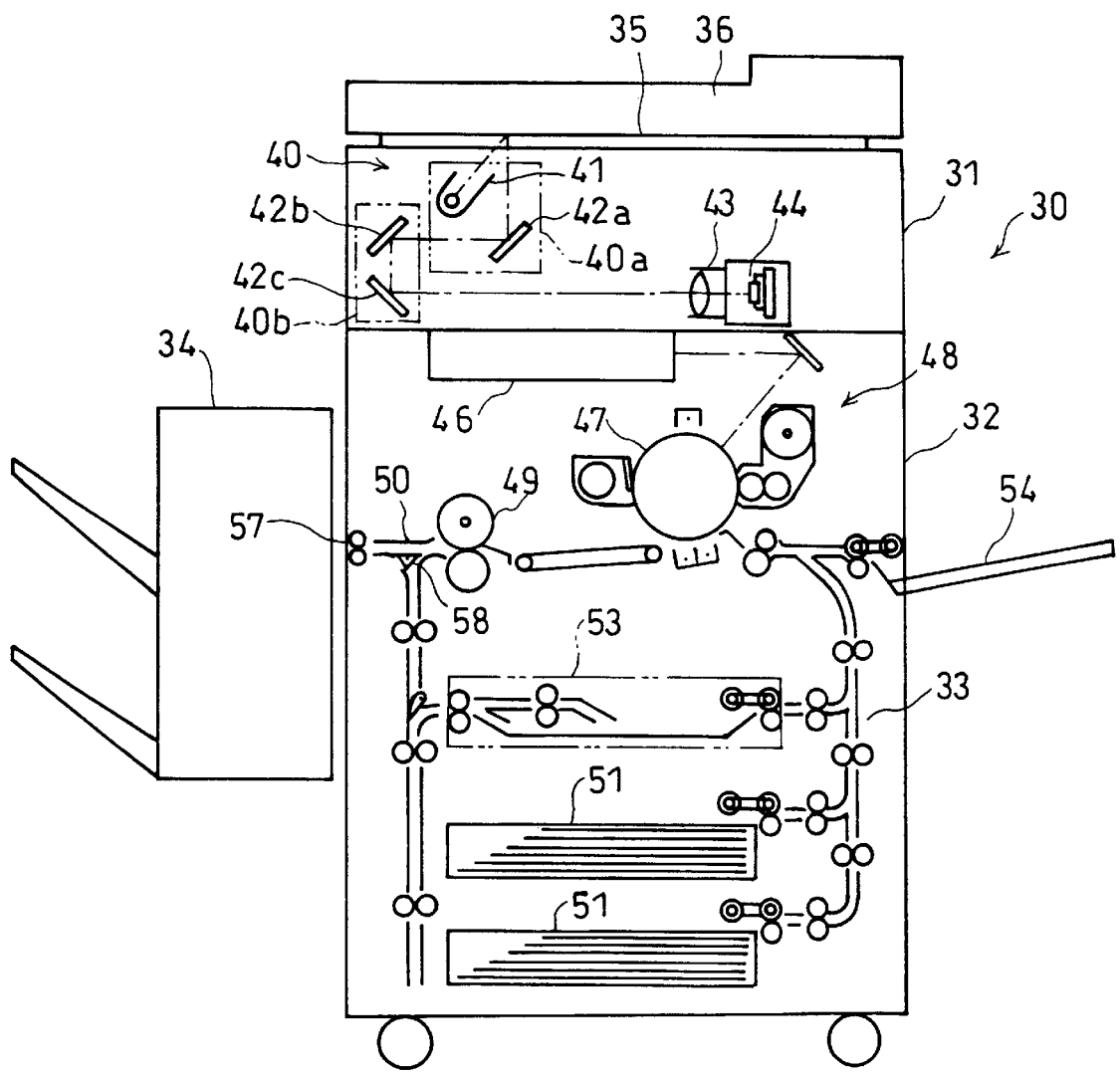
FIG. 2 is a cross-sectional view illustrating an entire arrangement of a digital copying machine equipped with a plurality of image input means, in accordance with the embodiment of the present invention.

FIG. 1 illustrates principal parts of a liquid crystal touch panel (display input device) composed of a tablet and a liquid crystal display section, provided on an operation panel in the digital copying machine. FIG. 2 is a cross-sectional view illustrating an arrangement of the whole digital copying machine equipped with an operation panel including the foregoing liquid crystal touch panel of the present invention. Note that detailed explanation on FIG. 1 will be made later in description on the operational panel.

To start with, the following description will explain the entire arrangement of the digital copying machine 30, while referring to FIG. 2.

As shown in FIG. 2, a main body of the digital copying machine 30 as an image forming device is composed of, roughly, a scanner section 31 and a laser recording section (recording means) 32. The scanner section 31 is composed of an original platen 35 made of transparent glass, an RADF (recirculating automatic document feeder) 36 for automatically transporting sheets of the original onto the original platen 35, and a scanner unit (original image reading unit) 40 for scanning and reading an image on a sheet of the original held on the original platen 35.

The original image read by the scanner section 31 is sent as image data to an image processing section (composed of a main image processing board 400 and a sub image processing board 500) which will be described later, where predetermined image processing is applied to the image data.

The RADF 36 is a device arranged so as to automatically feed a plurality of sheets of an original document, placed on an original tray (not shown), one by one onto the original platen 35 of the scanner unit 40. The RADF 36 includes a transport path for one-sided originals, a transport path for double-sided originals, transport path switching means, and a sensor group and a control section for detecting and controlling a state of a transported sheet of an original at several sections, so that either one side or both sides of each sheet of the original are read by the scanner unit 40 according to selection by an operator (user). Regarding the RADF 36, since many patent applications and commercialization thereof have been made, further explanation about it is omitted.

The scanner unit 40 composing the scanner section 31 for taking in an image of an original on the original platen 35 is composed of a lamp reflector assembly 41, a first scanning unit 40a incorporating a first reflection mirror 42a, a second scanning unit 40b incorporating a second reflection mirror 42b and a third reflection mirror 42c, an optical lens 43, and a CCD 44. The lamp reflector assembly 41 irradiates a surface of the original. So as to guide a reflected light image of the original to a CCD (photoelectric converting element), the first reflection mirror 42a of the first scanning unit 40a reflects light reflected by the original, and the second reflection mirror 42b and the third reflection mirror 42c of the second scanning unit 40b guide the reflected light image from the first reflection mirror 42a to the CCD 44. The optical lens 43 causes the reflected light image from the original, reflected by the foregoing reflection mirrors 42a to 42c, to be projected on the CCD 44. The CCD 44 converts the reflected light image of the original into an electric image signal.

The scanner section 31 is arranged so as to read images of the original while causing the scanner unit 40 to move along a lower surface of the original platen 35 in an associated manner with the operation of the RADF 36 of placing the original on the original platen 35 sheet by sheet.

More specifically, the first scanning unit 40a is moved at a constant speed V from left to right along the original platen 35, while the second scanning unit 40b is also moved in the same direction so as to be parallel, at a speed of 2/V, that is, half of the speed V.

In so doing, an image of a sheet of the original placed on the original platen 35 is projected line by line on the CCD 44, whereby the image is read.

Image data obtained by reading the original image with use of the scanner unit 40 are sent to the image processing section which will be described, and after various image processing operations are applied thereto at the image processing section, the data are stored in a memory of the image processing section temporarily. The image data in the memory are read out in response to an output instruction and transferred to a laser recording section (laser printer section) 32, which forms an image on a sheet of paper to be used for image formation thereon.

The laser recording section 32 is equipped with a sheet transport system, a laser writing unit 46, and an electrophotographic processing section 48.

The laser writing unit 46 incorporates a semiconductor laser light source, a polygon mirror, an f-θ lens, and the like. The semiconductor laser light source emits laser light in accordance with either (i) image data read out from the memory in which image data read by the aforementioned scanner unit 40 are stored or (ii) image data transferred from an external device such as a personal computer or a facsimile machine. The polygon mirror conducts constant angular velocity deflection with respect to the laser light. The light which has been thus deflected at a constant angular velocity is adjusted by the f-θ lens so as to deflect on a photosensitive drum 47 constituting the electrophotographic processing section 48 at a constant angular velocity.

The electrophotographic processing section 48 is equipped with a charger, a developer, a transfer unit, a separating unit, a cleaner, and a discharger around the photosensitive drum 47 which is already known.

On the other hand, the sheet transport system includes: a transport section 33 for transporting a sheet to a specific position at which the transfer unit is provided in the electrophotographic processing section 48 which conducts the aforementioned image formation; cassette feed devices (recording material supply means) 51 for sending a sheet to the transport section 33; manual feed devices (recording material supply means) 54 used for manually feeding sheets in required sizes; a fixing device 49 for fixing an image, particularly a toner image, which has been transferred and formed on a sheet; and a re-feed path 53 for use in re-feed of the sheet after fixation so that an image is formed on a reverse side of the sheet.

Further, on a downstream side to the fixing device 49 is provided a post-processing device 34 which receives the sheet on which the image has been recorded and conducts a predetermined processing operation with respect to the sheet.

In the laser writing unit 46 and the electrophotographic processing section 48, the image data read out from the image memory are converted into an electrostatic latent image formed on the surface of the photosensitive drum 47 by the laser writing unit 46 causing the laser beam to scan in accordance with the image data. The electrostatic latent image is visualized with toner, thereby becoming a toner image. The toner image is electrostatically transferred and fixed onto a surface of a sheet transported thereto from either the cassette feed devices 51 composing a multistage feed unit or the manual feed devices 54. The sheet on which the image has been thus formed is transported from the fixing device 49 to the post-processing device 34 through discharge rollers 57. Incidentally, a sheet is hereinafter referred to as paper, but a material for a sheet is not limited to paper.

(Explanation on Circuitry of Image Processing Section)

The following description will explain the arrangement and functions of the image processing section in the digital copying machine 30, the image processing section being intended to conduct image processing with respect to original image information taken in.

Figure 3:
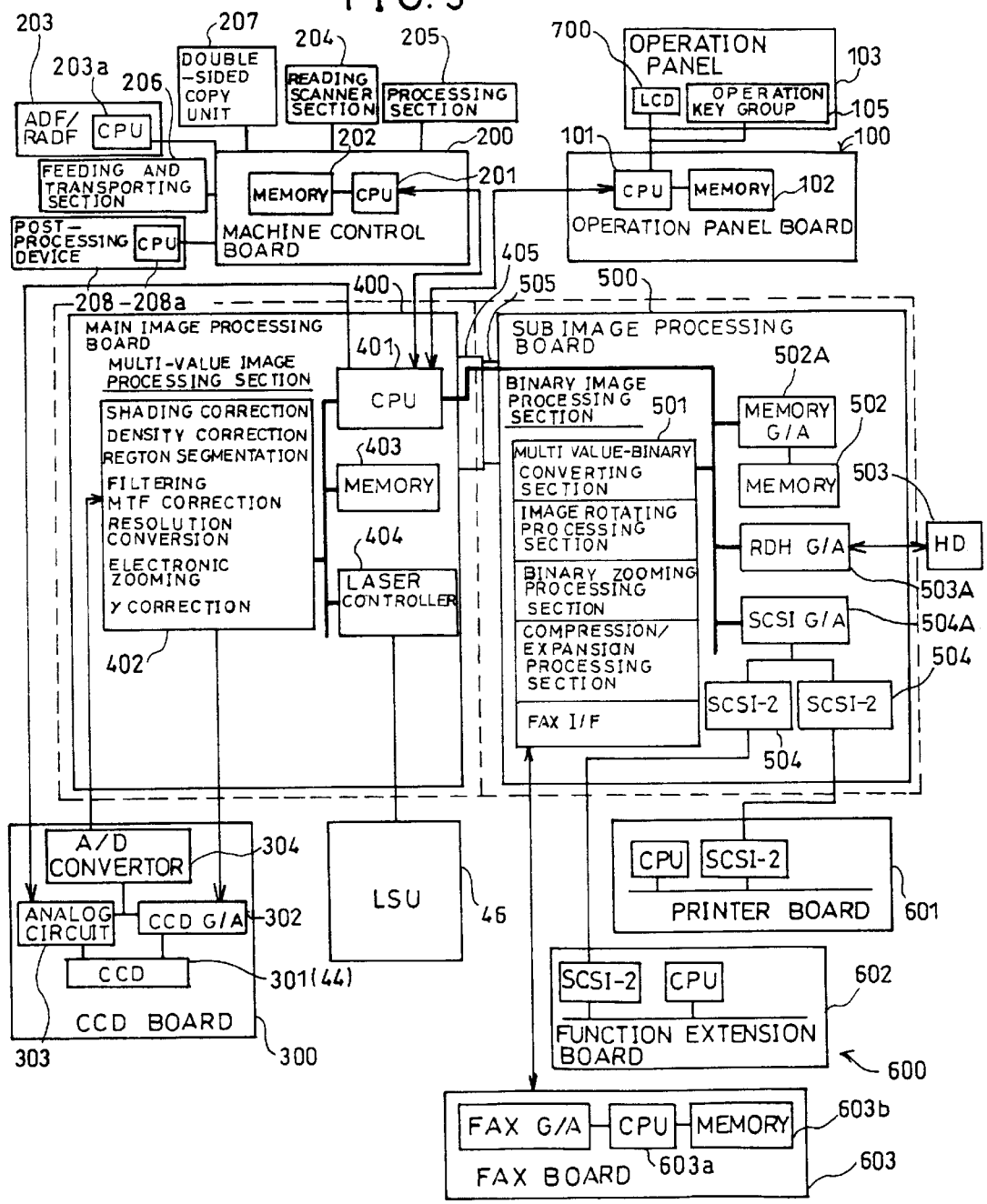
FIG. 3 is a block diagram illustrating a circuit arrangement of an image processing section as well as an entire arrangement of a control section in the digital copying machine in accordance with the embodiment of the present invention.

FIG. 3 is a block diagram showing respective units and the image processing section composing the entire digital copying machine 30 shown in FIG. 2. FIG. 3 illustrates a state in which operations of the respective parts are controlled by a main central processing unit (CPU) 401 which is disposed in the vicinity of the center, in cooperation with sub central processing units (CPU) 101 and 102 which are incorporated in the units respectively.

As clear from FIG. 3, the digital copying machine 30 is composed of an operation panel board 100, a machine control board 200, a CCD board 300, a main image processing board 400, a sub image processing board 500, and an extension board group 600 (a printer board 601, a function extension board 602, a FAX board 603). The operation panel board 100, shown above right in the figure, controls an operation panel 103. The machine control board 200, shown above left in the figure, controls the respective units constituting the digital copying machine 30. The CCD board 300, shown below left in the figure, electrically takes in and converts an original image into electronic data. The main image processing board 400, shown at the center of the figure, applies a predetermined image processing operation with respect to the original image converted into the electronic data by the CCD board 300. The sub image processing board 500 further applies a predetermined image processing operation to the image information thus processed by the main image processing board 400. The extension board group 600, shown below right in the figure, is connected with the sub image processing board 500 with interfaces provided therebetween. The following description will explain what controlling operations the respective boards conduct.

(Operation Panel Board)

The operation panel board 100, basically controlled by the sub CPU 101 as control means, controls command inputting operations, through the display screen of a liquid crystal display (LCD) section 700 and operation key group 105 for inputting instructions regarding the respective modes, which are provided on the operation panel 103.

On the operation panel board 100, a memory 102 is provided for storing various control information for the operation panel 103, including data supplied from the operation key group 105 and information to be displayed on the screen of the LCD section 700.

In this structure, the sub CPU 101 communicates control data with the main CPU 401, and instructs operations of the digital copying machine 30. Besides, control signals showing operational states of the digital copying machine 30 are transferred from the main CPU 401 to the sub CPU 101, so that the current operational states of the digital copying machine 30 are displayed to the operator through the LCD section 700 of the operation panel 103.

(Machine Control Board)

The whole machine control board 200 is controlled by a sub CPU 201, and controls an automatic document feeder (ADF) 203 such as RADF 36, equipped with a CPU 203a, a reading scanner section 204 for reading original images, a processing section 205 for reproducing image information by converting it into images, a feeding and transporting section 206 for sequentially transporting paper (sheet) on which images are recorded from a storing section to the processing section 205, a double-sided copy unit 207 for reversing paper on one side of which images have been recorded so that images are formed on both sides of paper, a post-processing device 208 equipped with a CPU 208a for applying a post-processing operation such as stapling with respect to the paper on which images have been recorded, and the like. The machine control board 200 is provided with a memory 202 for storing information on various types of control conducted by the sub CPU 201.

(CCD Board)

The CCD board 300 is composed of a CCD 301 (44) for electrically reading original images, a circuit (CCD gate array) 302 for driving the CCD 301, an analog circuit 303 for conducting gain adjustment with respect to analog data outputted from the CCD 301, an A/D converter for converting the analog output of the CCD 301 into digital signals and outputting the same as electronic data, and the like. The control of the CCD board 300 is conducted by the main CPU 401.

(Main Image Processing Board)

The main image processing board 400 is controlled by the main CPU 401. The main image processing board 400 is composed of a multivalued image processing section 402, a memory 403, a laser controller 404, and the like. Based on electronic data of the original images transferred from the CCD board 300, in order that the gray scales of the images can be expressed in desired conditions, the multivalued image processing section 402 applies processing operations such as shading correction, density correction, region segmentation, filtering, MTF (modulation transfer function) correction, resolution change, electronic zooming (variable magnification), and γ correction, with respect to image data which remain multivalued. The memory 403 stores processed image data, various control information such as information regarding processing procedure control, and other information. The laser controller 404 controls and transfers image data to the laser writing unit 46 so that images are reproduced with use of the processed image information.

(Sub Image Processing Board)

The sub image processing board 500 is connected with the main image processing board 400 with connectors 405 and 505 provided therebetween. The sub image processing board 500 is composed of a binary image processing section 501, a memory 502 for storing processed binary image information and control information for image processing, a gate array 502A for controlling the memory 502, a hard disk 503 for allowing original image information for a plurality of sheets of originals to be read out repeatedly required times so as to produce a plurality of copies thereof, a gate array 503A for controlling the hard disk 503, an SCSI 504 as an external interface, a gate array 504A for controlling the SCSI 504, and the like. These component parts of the sub image processing board 500 are controlled by the main CPU 401 on the main image processing board 400.

Further, the binary image processing section 501 is composed of a processing part for converting multivalued image information into a binary image, a processing part for rotating an image, a binary variable magnification (zooming) processing part, and the like. The binary image processing section 501 is further equipped with a facsimile interface so as to transmit/receive facsimile images through communication means.

(Extension Board Group)

The extension board group 600 includes a printer board 601, a function extension board 602, a FAX board (facsimile board) 603, and the like, so as to ensure that the digital copying machine 30 functions in a plurality of image input modes, image output modes, and image processing modes. The printer board 601 makes it possible that image data supplied from a personal computer and the like are outputted in the printer mode from the laser recording section 32 of the digital copying machine 30. The function extension board 602 extends editing functions of the digital copying machine 30 so that the characteristics of the digital copying machine 30 are fully utilized. The FAX board 603 is equipped with a CPU 603a and a memory 603b which make it possible that original images taken in through the scanner section 31 of the digital copying machine 30 or an external scanner section are sent to the other party of communication, and that image information transmitted from the other party is outputted by the laser recording section 32 of the digital copying machine 30.

The following description will explain in more detail image data processing and image data flow in the copy mode, the facsimile mode, and the printer mode which constitute the plurality of image input modes of the digital copying machine 30.

(Copy Mode)

An original set at a predetermined position on the RADF 36 of the digital copying machine 30 is supplied onto the original platen 35 of the scanner unit 40 sheet by sheet sequentially, and images of the original are sequentially read by the scanner unit 40 arranged as described above, and are transferred to the main image processing board 400 in, for example, 8-bit digital image data form.

The 8-bit electronic data thus transferred to the main image processing board 400 are, as 8-bit digital image data, subjected to a predetermined processing operation on the multivalued image processing section 402, whereby a processing operation such as γ correction is applied to the 8-bit digital image data. The processed data are sent to the laser writing unit 46 via the laser controller 404.

Through this process, the original image read by the scanner section 31 of the digital copying machine 30 are outputted as a copied image with gray scales from the laser recording section 32.

(Electronic RDH Function in Copy Mode)

Likewise, the original set at a predetermined position on the RADF 36 of the digital copying machine 30 is supplied onto the original platen 35 of the scanner unit 40 sheet by sheet sequentially, and images on the original are sequentially read by the scanner unit 40 arranged as described above, and are transferred to the main image processing board 400 in, for example, 8-bit digital image data form.

The 8-bit digital image data thus transferred to the main image processing board 400 are subjected to a predetermined processing operation on the multivalued image processing section 402. The 8-bit digital image data are subsequently sent to the sub image processing board 500 through the connector 405 on the main image processing board 400 and the connector 505 on the sub image processing board 500. The 8-bit digital image data thus sent to the sub image processing board 500 are subjected to error diffusion or the like and conversion to binary digital image data at the multivalue-to-binary converting part of the binary image processing section 501.

Incidentally, the conversion of 8-bit digital image data into binary digital image data in addition to other processing such as the error diffusion aims to avoid deterioration of image quality. This is because satisfactory image quality is not obtained by simple multivalue-to-binary conversion in some cases. The conversion of 8-bit digital image data into binary digital image data is also a result of consideration to image memory capacity.

The binary digital image data thus obtained through conversion are transferred to the hard disk 503, data equivalent to one page at once, and are temporarily stored therein.

When all the data of the originals set on the RADF 36 of the digital copying machine 30 are read, the binary digital image data temporarily stored in the hard disk 503 as above described are read out repeatedly an instructed number of times which corresponds to the number of required copies to be produced, under control of the gate array 503A. The read-out binary digital image data are sent through the connectors 405 and 505 to the main image processing board 400, where the image data are subjected to γ correction and the like. The processed data are sent to the laser writing unit 46 via the laser controller 404.

Through this process, the original image read by the scanner section 31 of the digital copying machine 30 are outputted as a copied image with gray scales from the laser recording section 32.

Incidentally, in the above description, it is explained that after all the images of all the originals are read, the images are read out repeatedly a number of times which corresponds to the number of required copies to be produced. Instead, it is possible to make the image output for the first copy be started whenever a set quantity of images becomes ready.

(Printer Mode)

Images transmitted from a networked external information processing device such as a personal computer are developed on the printer board 601 into page images (images divided into page units), and are temporarily transferred from the SCSI 504 which is a common-use interface, to the sub image processing board 500, then to a recording device such as the hard disk 503 where the images are stored.

Incidentally, the images thus developed into the page images on the printer,board 601 are transferred to the sub image processing board 500, but the page images are not subjected to the binary image processing, and are simply stored in the hard disk 503 temporarily. Besides, when the page images thus stored in the hard disk 503 are read out therefrom, the binary image processing is not carried out with respect to the page images.

Subsequently, the image information thus temporarily stored in the hard disk 503 is read out from the hard disk 503 in such a manner that the image information is read out in a predetermined page order, and is transferred to the main image processing board 400. In the main image processing board 400, γ correction is applied to the image information, and the laser controller 404 controls the writing of images by the laser writing unit (LSU) 46 so that the images are properly reproduced.

(Facsimile Mode)

The facsimile mode requires processing operations relating to transmission of an original to the other party and reception of an original from the other party.

To explain the transmission of an original to the other party, the original to be transmitted, which is placed at a predetermined position on the RADF 36 of the digital copying machine 30, is sent onto the original platen 35 of the scanner unit 40 sheet by sheet sequentially, and images of the original are sequentially read by the scanner unit 40 as described above, and thereafter transferred in the 8-bit digital image data form to the main image processing board 400.

Then, the 8-bit digital image data thus transferred to the main image processing board 400 are subjected to predetermined image processing on the multivalued image processing section 402. The 8-bit digital image data are sent to the sub image processing board 500 through the connector 405 on the main image processing board 400 and the connector 505 on the sub image processing board 500. The 8-bit digital image data are subjected to error diffusion or the like and conversion to binary digital image data at the multivalue-to-binary converting part of the binary image processing section 501.

Incidentally, the conversion of 8-bit digital image data into binary digital image data in addition to other processing such as the error diffusion aims to avoid deterioration of image quality. This is because satisfactory image quality is not obtained by simple multivalue-to-binary conversion in some cases.

The original to be transmitted, thus converted into binary images, is compressed in a predetermined form, and stored in the memory 502.

Then, when necessary transmission procedure is taken and a state transmissible to the other party is ensured, the original images in the predetermined compression form read out from the memory 502 are transferred to the FAX board 603 side. The original images to be transmitted, thus transferred to the FAX board 603, are therein subjected to necessary processing such as change in the compression form, and thereafter are sequentially transmitted to the other party through communication lines.

The following description will explain processing of original images transmitted from the other party.

When an original is transmitted from the other party through communication lines, the FAX board 603 receives the original images transmitted from the other party while taking a necessary communication procedure, and the received images compressed in a predetermined form are sent from the facsimile interface provided in the binary image processing section 501 of the sub image processing board 500 to the compression/expansion processing part or the like of the binary image processing section 501, where the original images transmitted in the page image form are reproduced.

Subsequently, the original images thus reproduced as page-unit images are transferred to the main image processing board 400. In the main image processing board 400, γ correction is applied to the original images, and the laser controller 404 controls the writing of images by the laser writing unit (LSU) 46 so that the images are properly reproduced.

As clear from the above description, the image processing section for applying predetermined processing operations to image information is divided into two main parts, i.e., the main image processing board 400 and the sub image processing board 500, so that the main image processing board 400 processes original images read by the scanner section 31 as multivalued image information and that the sub image processing board 500 applies predetermined processing operations such as binary processing to the original image information processed as multivalued image information by the main image processing board 400, or applies predetermined processing operations to image information supplied from external apparatuses which are connected thereto through the external interface, and thereafter transfers the processed image information to the multivalued image processing section (main image processing board 400).

Further, the main image processing board 400 includes the laser controller 404 for controlling the image information writing operation of the laser writing unit 46, so that images are reproduced by the laser writing unit 46 onto the photosensitive drum 47 of the electrophotographic processing section 48.

With the foregoing arrangement, the original images read by the scanner section 31 can be reproduced as copy images from the laser recording section 32, without losing characteristics which the original images possess as multivalued images. In the case where a massive original is processed and outputted at a high speed by using an electronic RDH function or the like, the sub image processing board 500 and the hard disk 503 may be additionally used so that reproduction of copy images is ensured.

Furthermore, it is also possible to apply appropriate processing operations to image information according to characteristic functions which the digital copying machine 30 has as a digital device. Here, the operations include processing and outputting operations with respect to image information supplied from external apparatuses including a facsimile machine and a printer, as well as, exclusively with respect to image information supplied from a facsimile machine, a binary processing operation for processing multivalued-image-processed original images transmitted so as to retain characteristics of the images.

Furthermore, by dividing the image processing section, it is possible to prepare many variations (lineups) of the digital copying machine 30, to set up a digital copying machine so as to comply with the user's demand, and to develop the system to comply with the user's demand after the setting.

The CPU 401 provided on the main image processing board 400 controls the sub image processing board 500 as well in the foregoing arrangement. By so doing, the flow of the image processing operation which is continuously carried out from one processing section to the other is controlled as a whole in the respective processing sections, and the flow of data and processing operations is made smoother, with no image data lost.

(Operation Panel)

Figure 4:
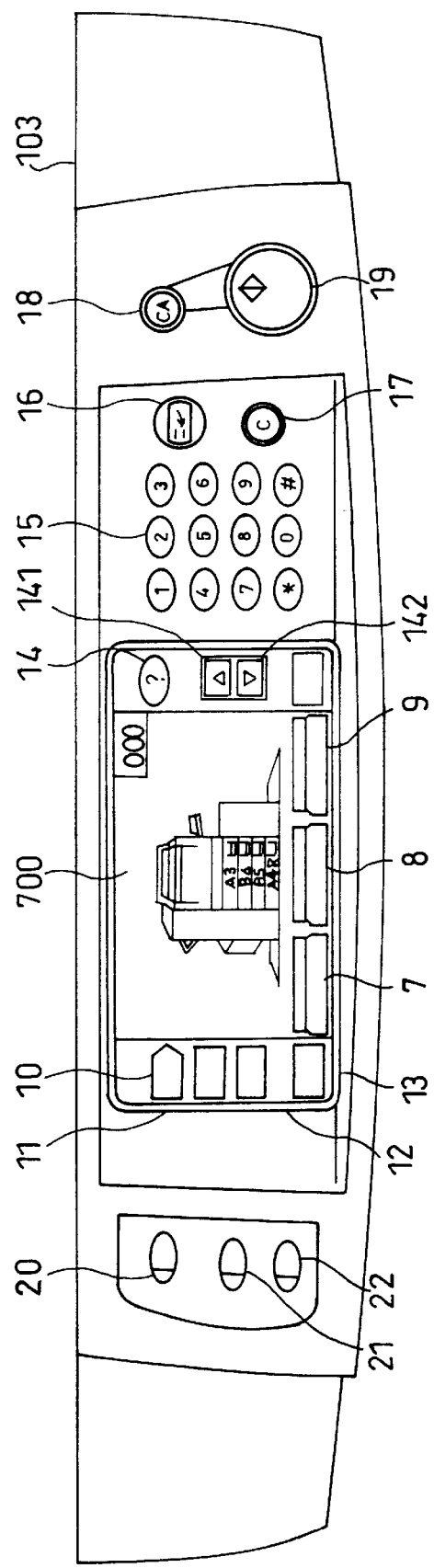
FIG. 4 is a plan view illustrating an example of the operation panel of the digital copying machine in accordance with the embodiment of the present invention.

FIG. 4 illustrates the operation panel 103 in the digital copying machine 30.

The operation panel 103 has in its center a liquid crystal touch panel 6 shown in FIG. 1, and a mode setting key group around the liquid crystal touch panel 6.

Note that FIG. 1 is a principal part enlarged view illustrating the liquid crystal touch panel 6 of the operation panel 103. In the operation panel 103, the following are provided, as shown in FIGS. 1 and 4: the liquid crystal touch panel 6; a copy density setting key 7; a paper selecting key 8; a magnification setting key 9; a special function mode key 10; a double-sided copy key 11; a sort/staple key 12; a setting check key 13; an operation guide key 14; numeric keys 15; an interruption key 16; a clear key 17; a clear-all key 18; a start key 19; a facsimile mode key 20; a printer mode key 21; a copy mode key 22; and scroll keys 141 and 142.

The touch panel 6 usually displays a basic start screen for mode selection, and the liquid crystal screen is arranged so as to shift when an area indicating an instruction relating to selection of a desired mode is pressed with use of a finger so that the desired mode is selected. The desired editing function is set by touching by the finger a region indicating a function the operator desires, among regions indicating the various modes displayed.

To briefly explain the mode setting key group provided on the operation panel 103, an outward appearance of the digital copying machine 30 is displayed in the vicinity of the center of the liquid crystal touch panel 6. Below the outward appearance illustration are disposed the copy density setting key 7 for setting the copy density, the paper selecting key 8 for setting paper size, and the magnification setting key 9 for setting copy magnification.

Further, the special function mode key 10 is a key for causing the display screen of the liquid crystal touch panel 6 to shift to an editing mode setting screen for editing an original image. The double-sided copy mode key 11 is a key for causing the display screen to shift to a setting screen for setting the processing mode in the double-sided copy mode. The sort/staple key 12 is a key for causing the display on the liquid crystal display screen to shift to a screen for setting an output mode such as a sort mode and a staple mode. The setting check key 13 is a key for checking the content of a mode currently set.

Furthermore, the operation guide key 14 is a key for causing guidance information such as operating steps to be displayed on the screen. The scroll keys 141 and 142 are keys for scrolling up and down the guidance information displayed on the liquid crystal touch panel 6 by the operation of the operation guide key 14 so that the whole guidance information is viewed.

The numerical keys 15 are keys for inputting numerical information such as the number of copies to be produced.

The interruption key 16 is a key for interrupting a currently-proceeding copy mode by a new copy mode and continuing the processing in the new mode. The clear key 17 is a key for clearing the settings inputted through, for example, the numerical keys 15. The clear-all key 18 is a key for clearing all the state of the digital copying machine 30 and resetting to the normal state. The start key 19 is a key for starting the processing in the mode set by the above keys.

Incidentally, arranged in the left part of the operation panel 103 are three keys used for switching the image input mode among the three modes. The keys are, from the top, a facsimile (FAX) mode key (input selecting means) 20, a printer mode key (input selecting means) 21, and a copy mode key (input selecting means) 22. The facsimile mode key 20 is a key for switching the input mode of the digital copying machine 30 to the facsimile mode and causing the machine to function in that mode. The printer mode key 21 is a key for switching the input mode of the digital copying machine 30 to the printer mode and causing the machine to function in that mode. The copy mode key 22 is a key for switching the input mode of the digital copying machine 30 to the copy mode and causing the machine to function in that mode.

The above-mentioned operation panel 103 and the keys provided thereon are merely examples for explaining one embodiment of the present invention. Needless to say, the keys on the operation panel 103 may vary depending on various functions built in the digital copying machine 30.

(Description on Liquid Crystal Panel 6)

FIGS. 5 to 8 are views illustrating in more detail the contents displayed on the liquid crystal touch panel 6 of the operation panel 103 of the digital copying machine 30 shown in FIG. 4.

The liquid crystal touch panel 6 is composed of the LCD section (recording material information display means) 700 in dot matrix and a transparent tablet 701 which is laminated over the LCD section 700. The tablet 701 covering the LCD section 700 has a larger area than that of the LCD section 700 so as to also cover a plurality of button groups (keys 10 to 13 and the like) which are printed around the LCD section 700. With this arrangement, not only the keys displayed on the LCD section 700 but also the buttons printed around the LCD section 700 can be operated by touching the tablet 701.

In the vicinity of the center of the LCD section 700 thus arranged, an illustration 702 of the outward appearance of the digital copying machine 30 provided with the operation panel 103 is displayed. To briefly explain the outward appearance illustration 702, an outward appearance illustration 725 of the cassette feed devices 51 and an illustration of the manual feed devices 54 are displayed below and on the right-hand side to the illustration 702 of the digital copying machine 30 main body, respectively, as viewed in the figure.

Incidentally, the figure shows a state in the case where the machine 30 has six cassette feed devices 51 and two manual feed devices 54. The six cassette feed devices 51 are a cassette feed device for A4-size paper (A4 landscape) (this device is hereinafter referred to as T1), a cassette feed device for A3-size paper (A3 portrait) (hereinafter referred to as T2), a cassette feed device for B4-size paper (B4 portrait) (hereinafter referred to as T3), a cassette feed device for B5-size paper (B5 landscape) (hereinafter referred to as T4), a cassette feed device for A4R-size paper (A4 portrait) (hereinafter referred to as T5), and a cassette feed device for A4-size paper (A4 landscape) (hereinafter referred to as T6). The two manual feed devices 54 are an envelope-use manual feed device, and a usual manual feed device for A4-size paper.

Note that in the present specification "portrait" means that paper is placed in such a manner that the lengthwise direction thereof is parallel with the paper transport direction, while "landscape" means that paper is placed in such a manner that the lengthwise direction thereof crosses the paper transport direction.

On the left-hand side to the outward appearance illustration 702 of the digital copying machine 30 main body, there is displayed an outward appearance illustration 704 of the post-processing device 34 for applying a post-processing operation such as stapling with respect to paper outputted from the digital copying machine 30.

Transition of the screen when the tablet 701 is operated by checking the display on the LCD section 700 will be explained below. First of all, by touching either of the outward appearance illustrations 703, 704, and 725 displayed in the vicinity of the center of the LCD section 700 shown in FIG. 5, the screen shifts from an initial screen to a screen of either of the doublesided copy mode, the output mode, and the paper selection mode.

Figure 6:
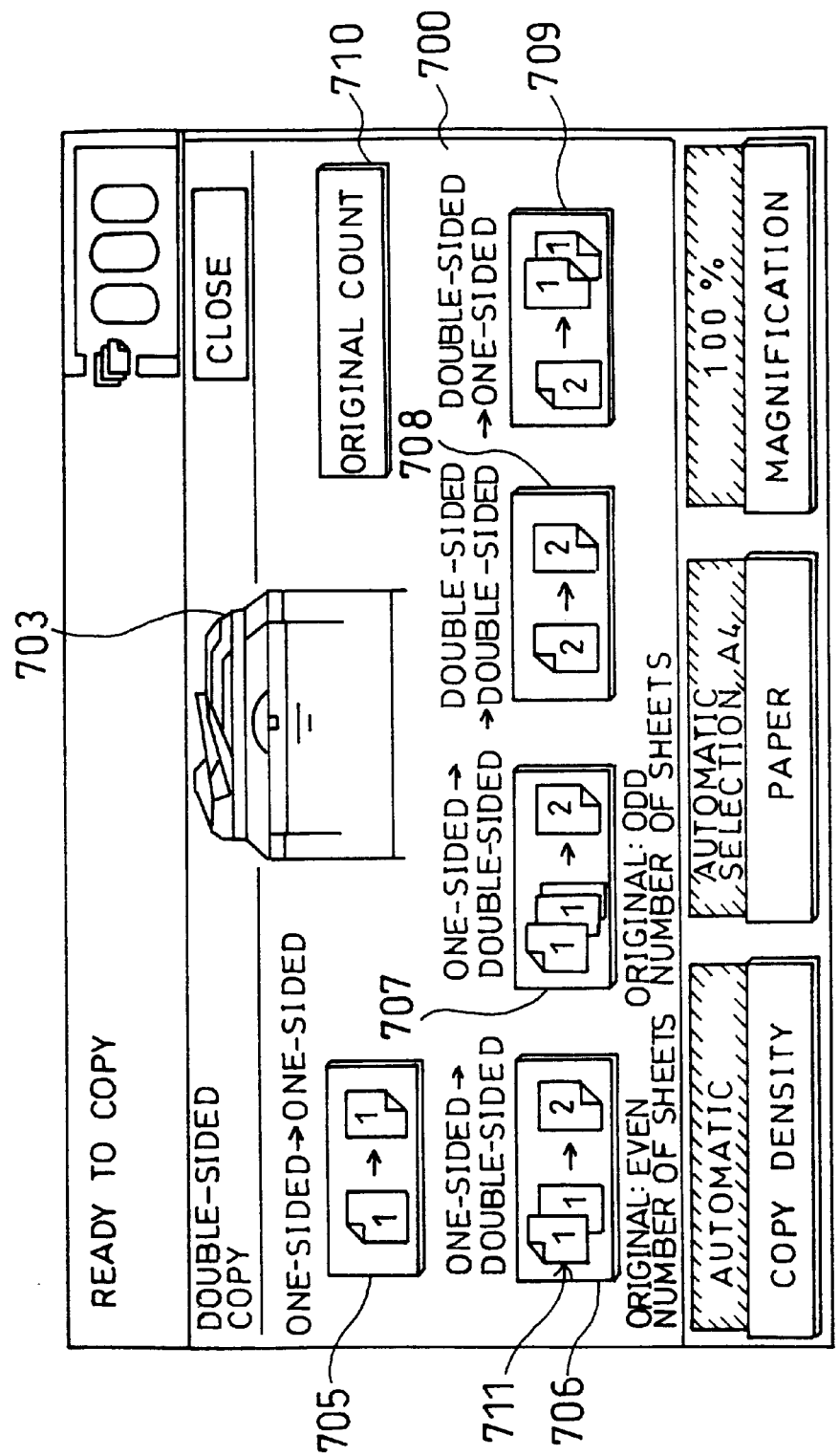
FIG. 6 is an explanatory view illustrating a screen of the LCD section during double-sided copy mode setting, in accordance with the embodiment of the present invention.
Figure 7:
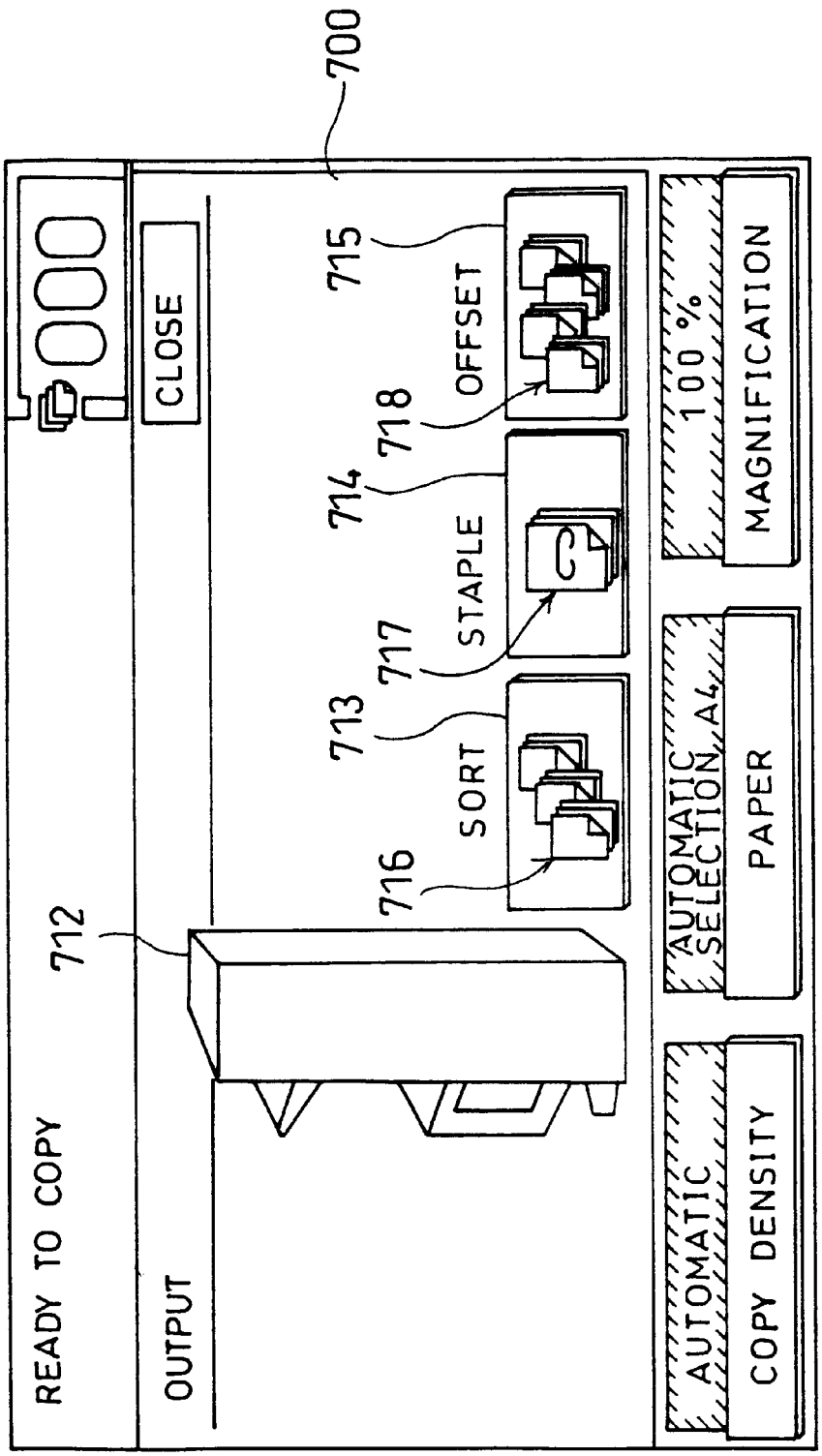
FIG. 7 is an explanatory view illustrating a screen of the LCD section during output mode setting, in accordance with the embodiment of the present invention.
Figure 8:
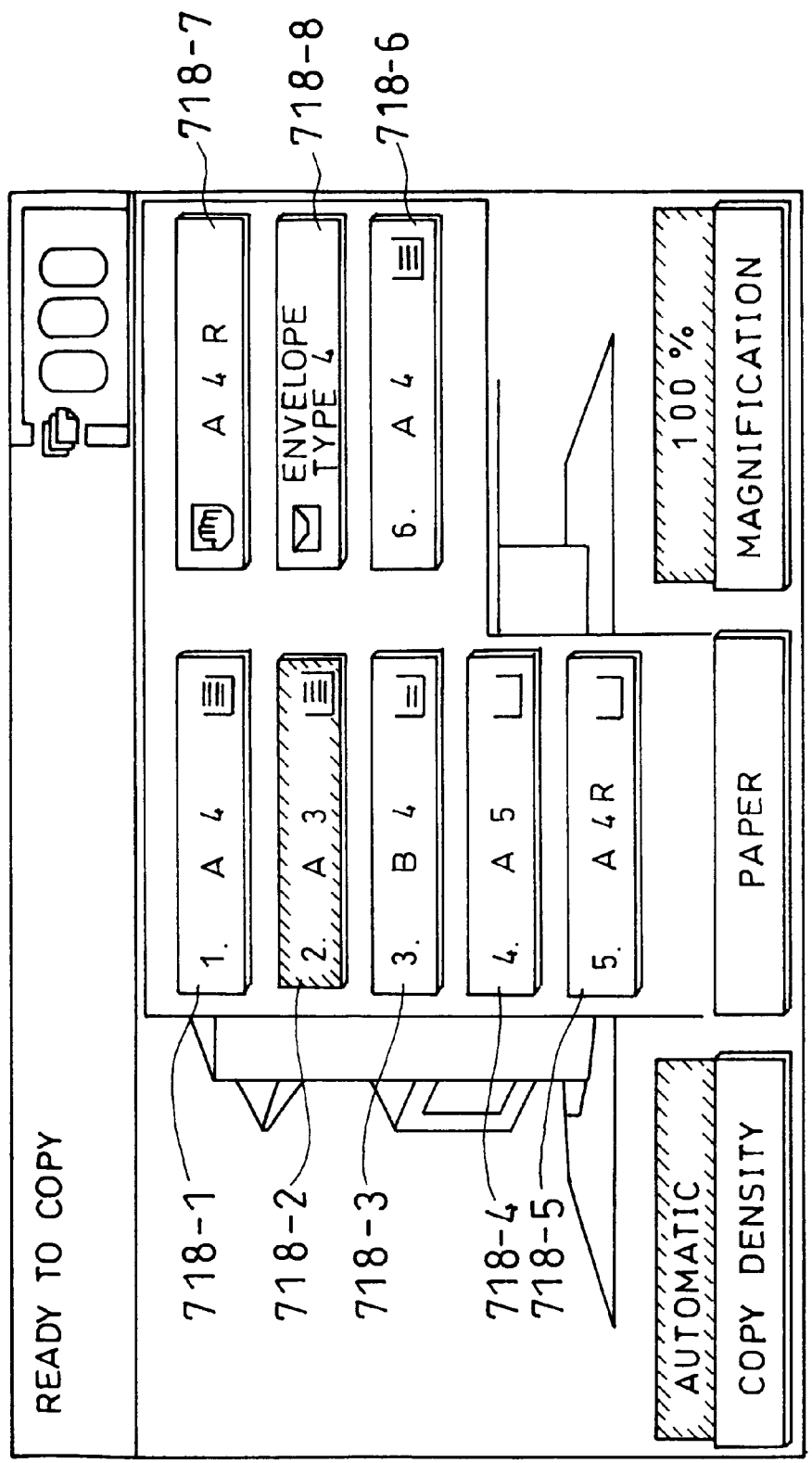
FIG. 8 is an explanatory view illustrating a display screen of the LCD section during paper selection mode setting, in accordance with the embodiment of the present invention.

More specifically, in response to touch to the outward appearance illustration 703 as a part of the outward appearance illustration 702 of the digital copying machine 30, the screen shifts to a mode setting screen as shown in FIG. 6 corresponding to the doublesided copy mode. On the other hand, in response to touch to the outward appearance illustration 704 illustrating the post-processing device 34, the screen shifts to the output mode setting screen as shown in FIG. 7. In response to touch to the outward appearance illustration 725 illustrating the cassette feed devices 51, the screen shifts to the screen as shown in FIG. 8 for selecting one from among the feed devices 51 and 54, that is a setting screen for selecting one containing paper of a desired size from among the plurality of feed devices 51 and 54.

Incidentally, The shift to the setting screen for the double-sided copy mode, the shift to the setting screen for the output mode, and the shift to the setting screen for the paper selection mode can be achieved by, instead of doing as above, touching the double-sided copy key 11, touching the sort/staple key 12, and touching the paper selecting key 8 printed on the left-hand side to the LCD section 700, respectively.

Figure 5:
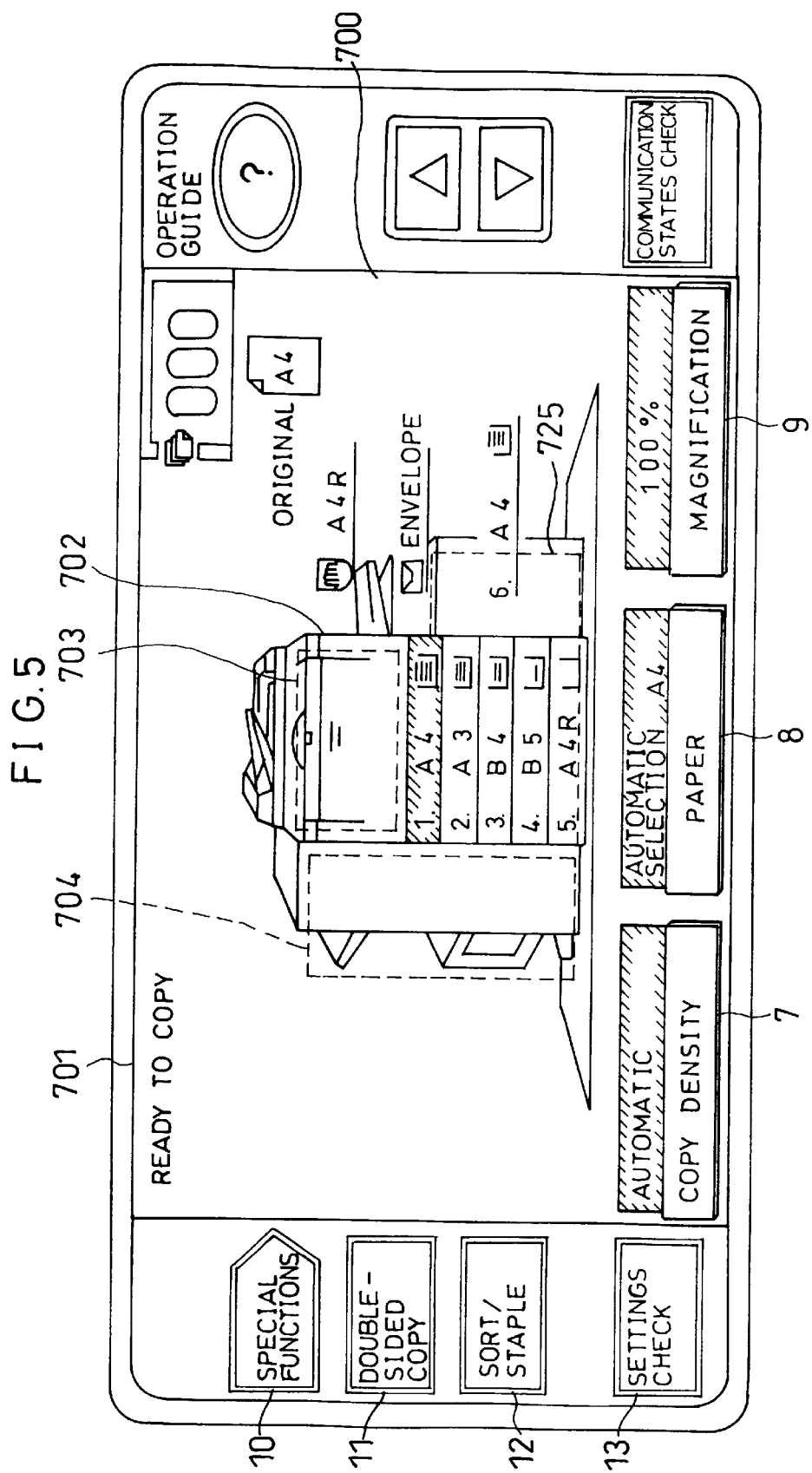
FIG. 5 is an explanatory view for explaining screen transition of an LCD section of the operation panel, in accordance with the embodiment of the present invention.

The following description will explain in more detail the respective cases where the initial screen shown in FIG. 5 shifts to the respective screens for the double-sided copy mode, the output mode, and the paper selection mode.

(Double-Sided Copy Mode)

Figure 9:
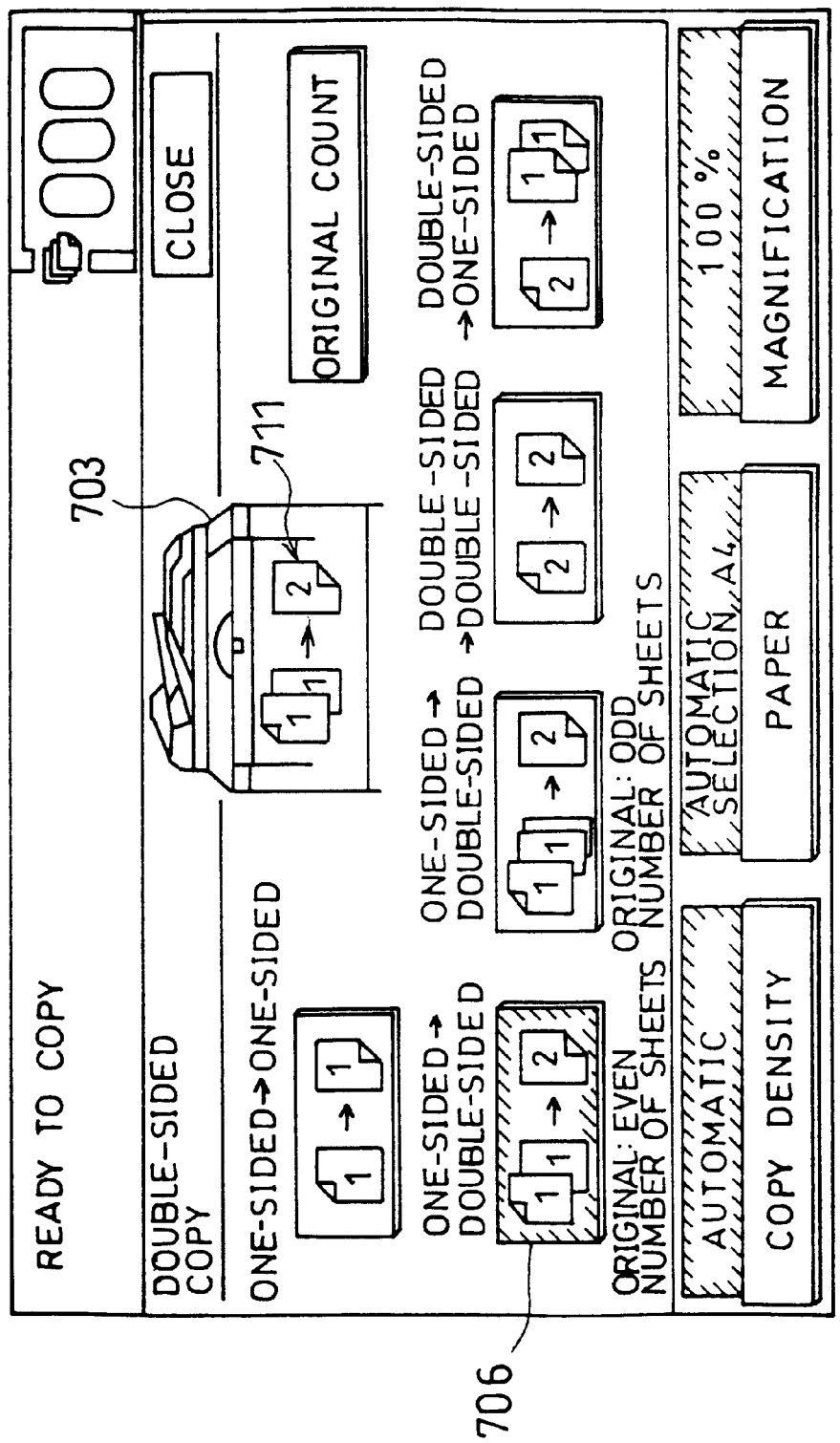
FIG. 9 is an explanatory view illustrating a state of the screen in a one-side=double-side mode after transition from the state shown in FIG. 6.
Figure 10:
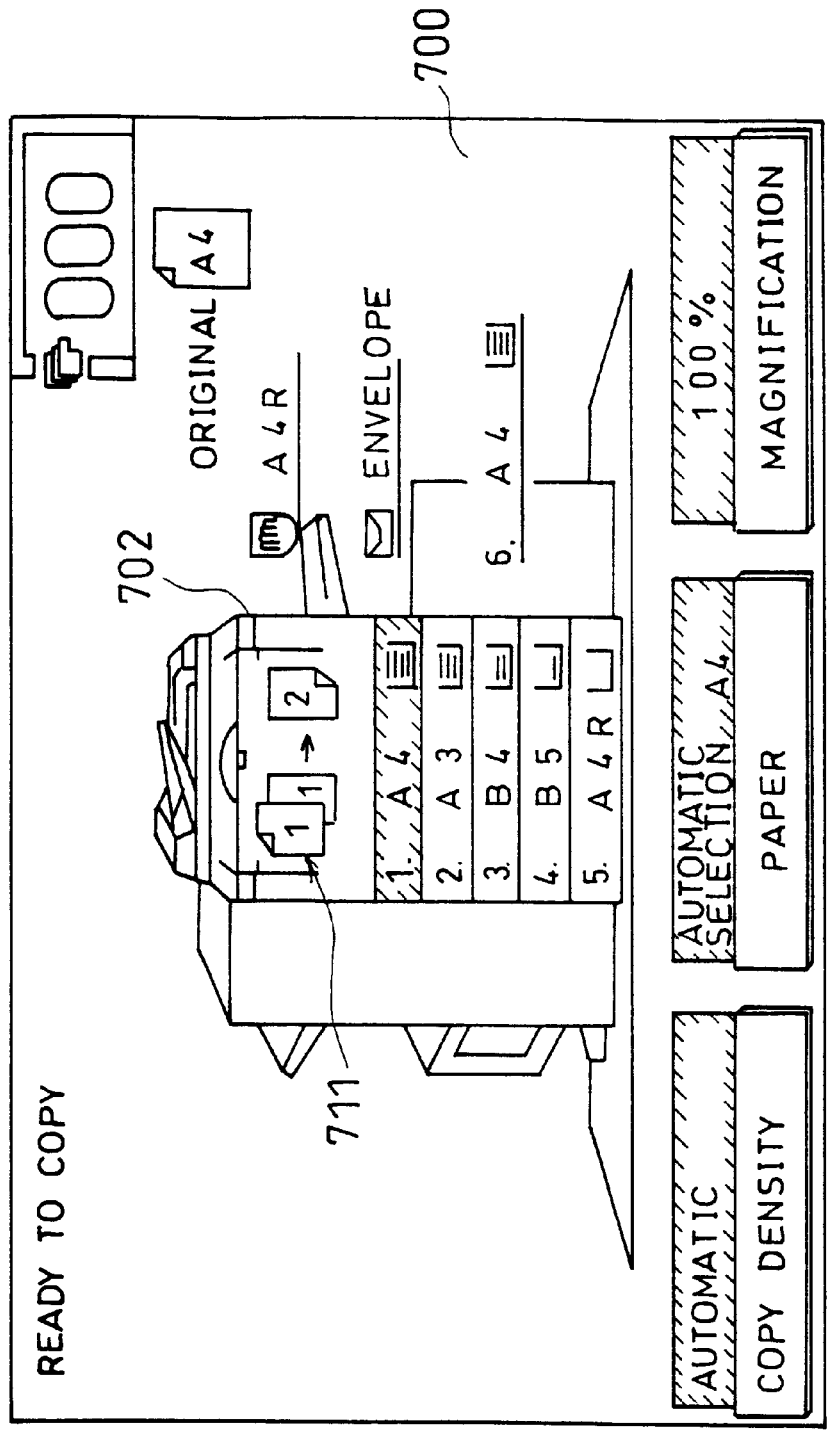
FIG. 10 is an explanatory view illustrating a state of the screen after transition from the state shown in FIG. 9.

The following description will explain the screen transition of the LCD section 700, while referring to FIGS. 6, 9, and 10.

In the vicinity of the center of the LCD section 700 whose screen shifts to the screen for the double-sided copy mode shown in FIG. 6, the outward appearance illustration 703 of the digital copying machine 30 which has been touched remains unchanged, and in the other areas, setting keys 705 to 711 relating to the settings for the double-sided copy mode are displayed.

Incidentally, the foregoing description explains the case where the illustration 703 of the digital copying machine 30 remains at the same display position and in the same display conditions in the vicinity of the center of the LCD section 700 which has shifted to the doublesided copy mode setting screen, while keys for setting detailed conditions for the mode are displayed in the other areas, i.e., around the illustration 703. It is possible, however, that the illustration 703 of the digital copying machine 30 is moved to a more or less different position and the keys for setting detailed conditions for the mode are displayed in the other areas.

In the latter case, in order to make the operator as less confused as possible, it is preferable that the illustration 703 is not moved beyond necessity, and that the same display form is maintained.

Here, the keys 705 to 711 displayed in the other areas are briefly explained below. The one-side-to-one-side mode key 705 positioned in the left part of the illustration 703 is a key for choosing the one-side-to-one-side mode in which one-sided copies are produced from one-sided originals. This key is selected in the normal state (standard state) before the double-sided copy mode is selected.

Further, below the illustration 703, the following are provided, from left to right: the one-side-to-double-side mode key 706 for choosing the one-side-to-double-side mode in which double-sided copies are produced from one-sided originals with an even number of sheets; the one-side-to-double-side mode key 707 for choosing the one-side-to-double-side mode in which double-sided copies are produced from one-sided originals with an odd number of sheets; the double-side-to-double-side mode key 708 for choosing the double-side-to-double-side mode in which double-sided copies are produced from double-sided originals; and the double-side-to-one-side mode key 709 for choosing the double-side-to-one-side mode in which one-sided copies are produced from double-sided originals. On these keys 705 to 709, icons 711 graphically illustrating the respective modes are displayed.

Incidentally, on the right-hand side to the illustration 703, there is provided an original count key 710 which is used for counting the number of sheets of the original set on the automatic document feeder 203 in the case where, in the one-side-to-double-side copying operation, whether the number of the sheets of the original is even or odd is unknown.

When any one of the double-sided modes (one-side-to-double-side mode, double-side-to-double-side mode, double-side-to-one-side mode) is selected by using the key groups 706 to 709, the icon 711 illustrating the selected double-sided mode is displayed overlapping the illustration 703 of the digital copying machine 30.

As the icon 711 displayed overlapping the illustration 703, the same one as the icon displayed on the one-side-to-double-side mode key 706 for setting detailed contents of the selected mode may be displayed so as to avoid confusion of the operator.

Incidentally, the foregoing description explained that when the desired mode is designated by using one selected from among the setting keys 706 to 709 displayed around the illustration 703 displayed on the LCD section 700, the icon 711 indicating the mode thus designated is displayed overlapping the illustration 703. However, instead, not by touching the tablet 701 laminated over the LCD section 700, but by touching a button other than those of the tablet 701 provided on the operation panel 103, the icon 711 indicating the selected mode may be displayed overlapping the illustration 703 displayed on the LCD section 700.

When the setting of the mode relating to the double-sided copy is completed, the display state returns to the state in which the outward appearance illustration 702 of the whole digital copying machine 30 is displayed while the states of the illustration 703 of the digital copying machine 30 and the icon 711 relating to the set mode on the LCD section 700 are maintained without changing, as shown in FIG. 10.

Incidentally, the foregoing description describes that the display state returns to the state in which the illustration 702 of the whole digital copying machine 30 is displayed with the icon 711 remaining displayed, but depending on the mode designated, it is possible to return the display to the state in which the illustration 702 of the whole digital copying machine 30 is displayed while not displaying the icon 711.

Furthermore, when the outward appearance illustration 702 of the entire digital copying machine 30 is displayed again upon completion of the mode setting relating to double-sided copy, it is preferable that the illustration 702 basically reappears at the same position. More specifically, it is preferable that the hidden part of the outward appearance illustration 702 is again displayed, with the outward appearance illustration 703 already displayed being kept remaining there. The illustration 702, however, when being again displayed, may be displaced to such an extent as not to give a sense of incongruity.

(Output Mode)

In the left part of the LCD section 700 which has shifted to the output mode setting screen shown in FIG. 7, the outward appearance illustration 712 of the post-processing device 34 operated is kept remaining, while keys 713 to 715 for various settings relating to the output mode are displayed in the other region.

Incidentally, the foregoing explanation explains an arrangement wherein the outward appearance illustration 712 of the post-processing device 34 is kept displayed at the same display position in the same display form in the substantially left part of the LCD section 700 while the keys for detailed settings of the mode are displayed on the left-hand side to the illustration 712. The illustration 712 of the post-processing device 34 may, however, be slightly displaced and the keys 713 to 715 for more detailed settings for the mode may be displayed in the other region.

Incidentally, it is preferable here, in order to confuse the operator as less as possible, that the illustration 712 displayed is not displaced by an unnecessarily great distance, and that the same display form is maintained.

To briefly explain the keys 713 to 715 displayed in the other region, the keys provided on the right-hand side to the illustration 712 are, from left, a sort mode key 713 for designating the sort mode in which paper outputted from the digital copying machine 30 are sorted out, a staple mode key 714 for designating the staple mode in which a plurality of sheets of paper outputted is stapled, and an offset mode key 715 for designating an offset mode in which sheets of paper outputted from the digital copying machine 30 are sorted so that each set of sheets corresponding one copy of the original is offsetted from another.

By using the foregoing keys 713 to 715, one or a plurality of output modes are selected from among the three output modes, i.e., the sort mode, the staple mode, and the offset mode, and an icon indicating the output modes selected is displayed overlapping the outward appearance illustration 712 of the digital copying machine 30.

Figure 11:
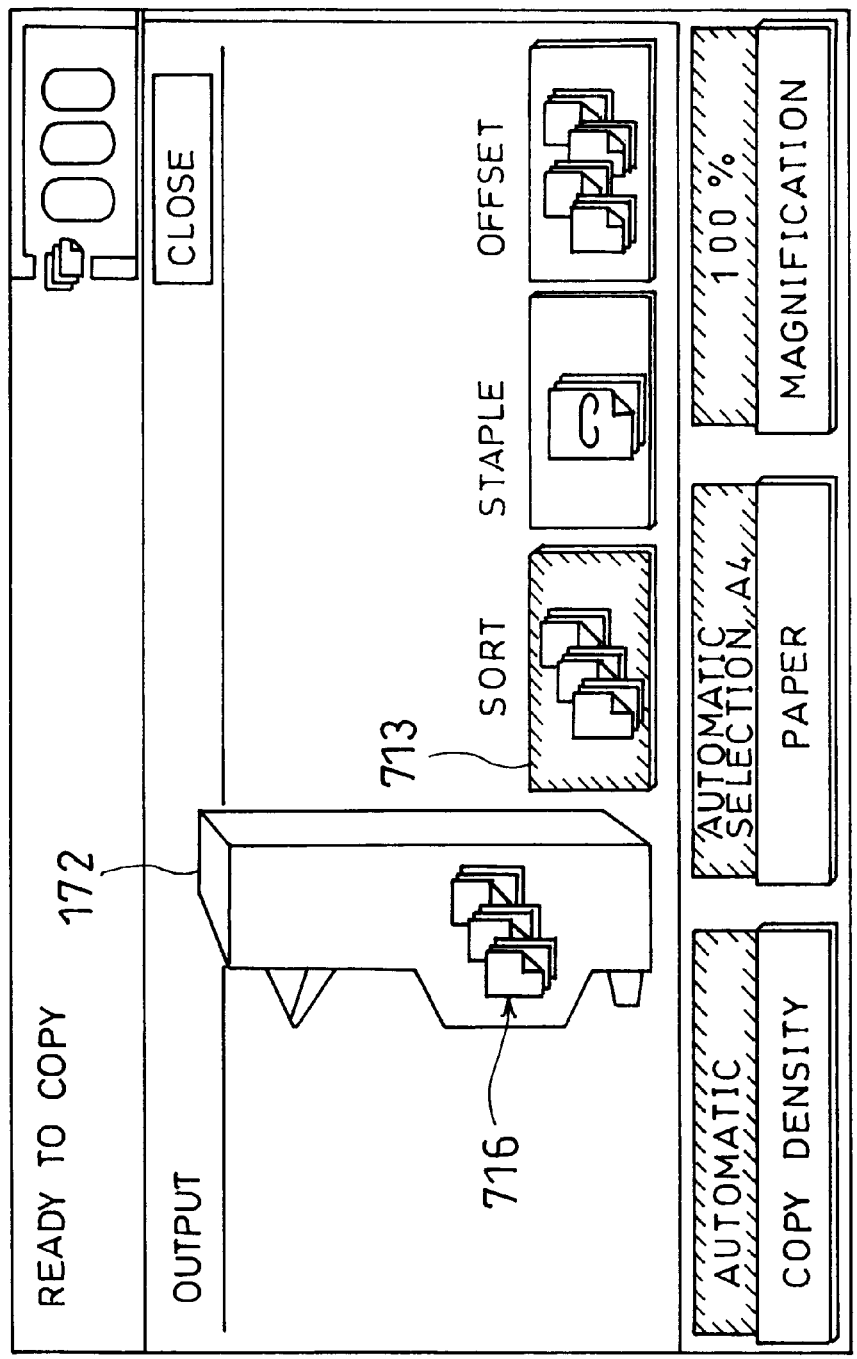
FIG. 11 is an explanatory view illustrating a state of the screen in a sort mode after transition from the state shown in FIG. 7.
Figure 12:
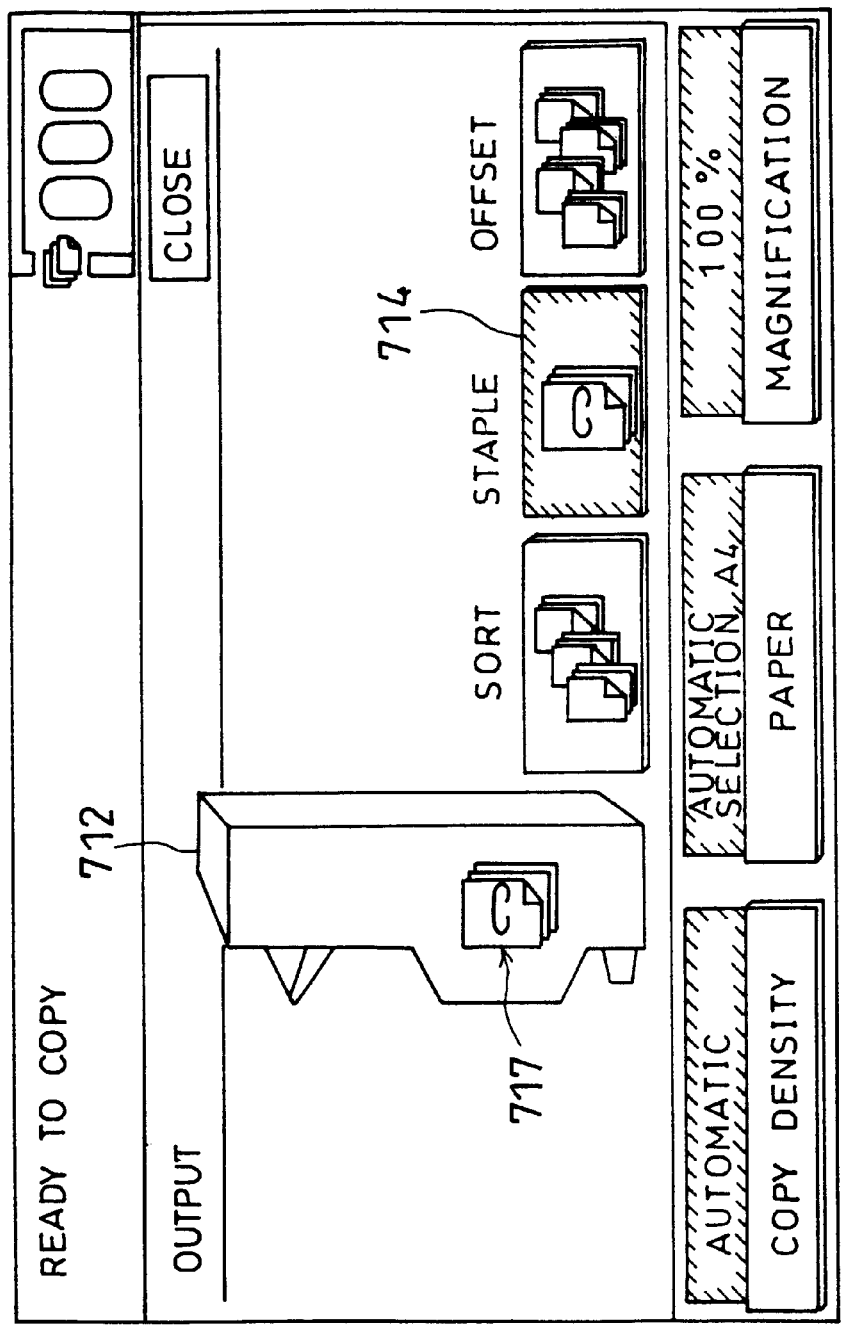
FIG. 12 is an explanatory view illustrating a state of the screen in a staple mode after transition from the state shown in FIG. 7.

To be more specific, in the case where only the sort mode is selected, an icon 716 indicating the sort mode is displayed overlapping the outward appearance illustration 712, as shown in FIG. 11. In the case where only the staple mode is selected, an icon 717 indicating the staple mode is displayed overlapping the outward appearance illustration 712, as shown in FIG. 12. In the case where only the offset mode is selected, an icon 718 indicating the offset mode is displayed overlapping the outward appearance illustration 712, though this case is not shown.

The icons 716, 717, and 718 displayed overlapping the outward appearance illustration 712 may be made identical to the icons displayed on the keys 713, 714, and 715 for detailed settings for the mode selected, respectively, so as to prevent the operator from getting confused.

Incidentally, the foregoing description explains that when a desired output mode is selected by operating any corresponding one among the setting keys 713 to 715 displayed on the right-hand side to the outward appearance illustration 712 displayed on the LCD section 700, one of the icons 716 to 718 indicating the selected output mode is displayed overlapping the outward appearance illustration 712. However, it is possible that, not by operating the tablet 701 laminated on the LCD section 700 but by operating buttons provided on a region of the operation panel 103 other than the tablet 701, the icon 716, 717, or 718 indicating the mode set may be displayed overlapping the illustration 712 displayed on the LCD section 700.

Furthermore, in the case where the icon 716, 717, or 718 relating to the output mode thus set is displayed overlapping the illustration 712, the icon is preferably displayed, in the illustration 712, at a position of the device which executes the output mode thus designated, or a position at which a resultant object by the execution of the output mode is obtained. With this arrangement, the operator can be precisely informed of the position at which the output mode is executed or a position at which a resultant object by the execution of the output mode is obtained.

Figure 13:
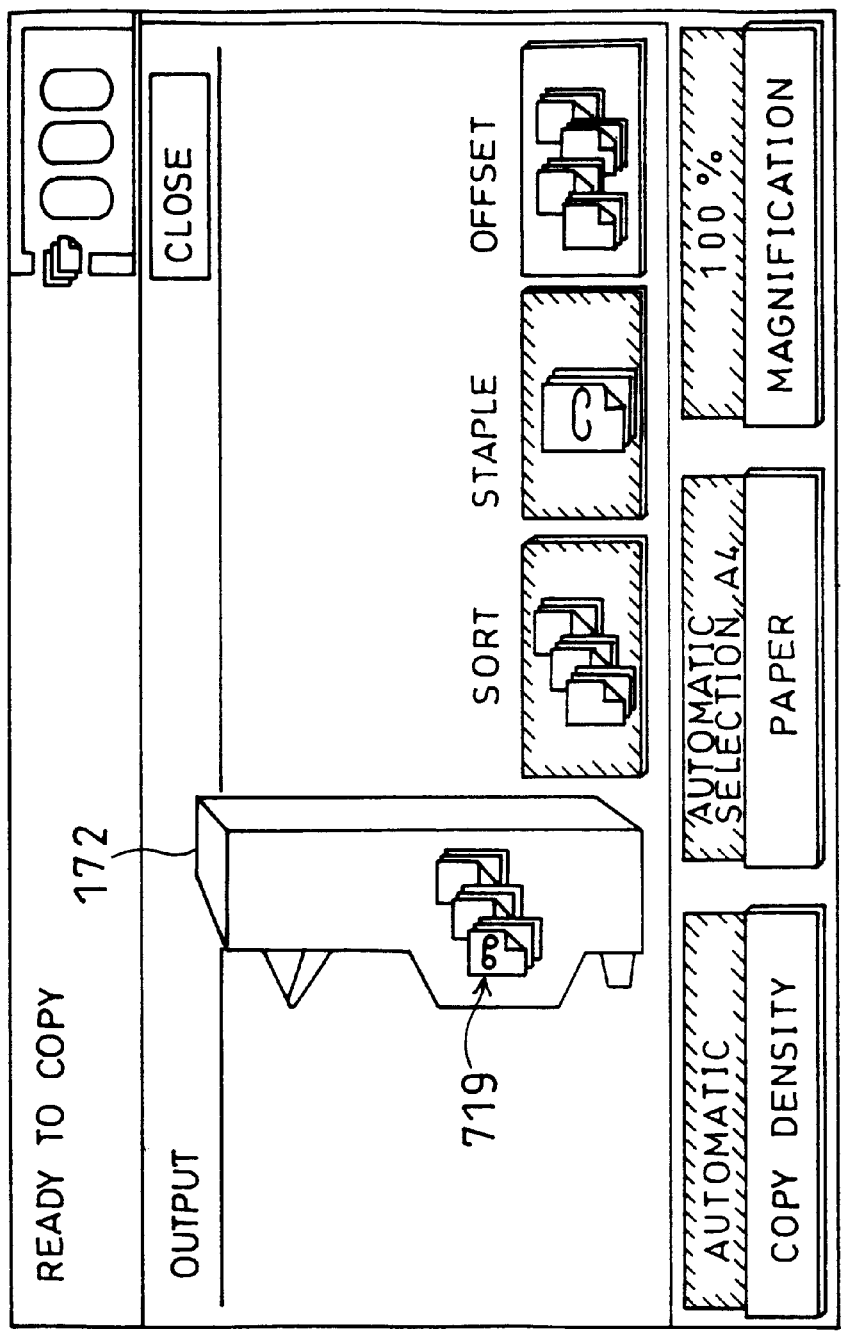
FIG. 13 is an explanatory view a state of the screen after transition from the states shown in FIGS. 11 and 12.

Furthermore, in the case where a plurality of output modes are set regarding the post-processing device 34, for example, the sort mode shown in FIG. 11 and the staple mode shown in FIG. 12 are set simultaneously, an icon 719 indicating the plurality of output modes thus set (here, the sort mode and the staple mode) may be displayed at an appropriate position, overlapping the outward appearance illustration 712, as shown in FIG. 13.

Figure 14:
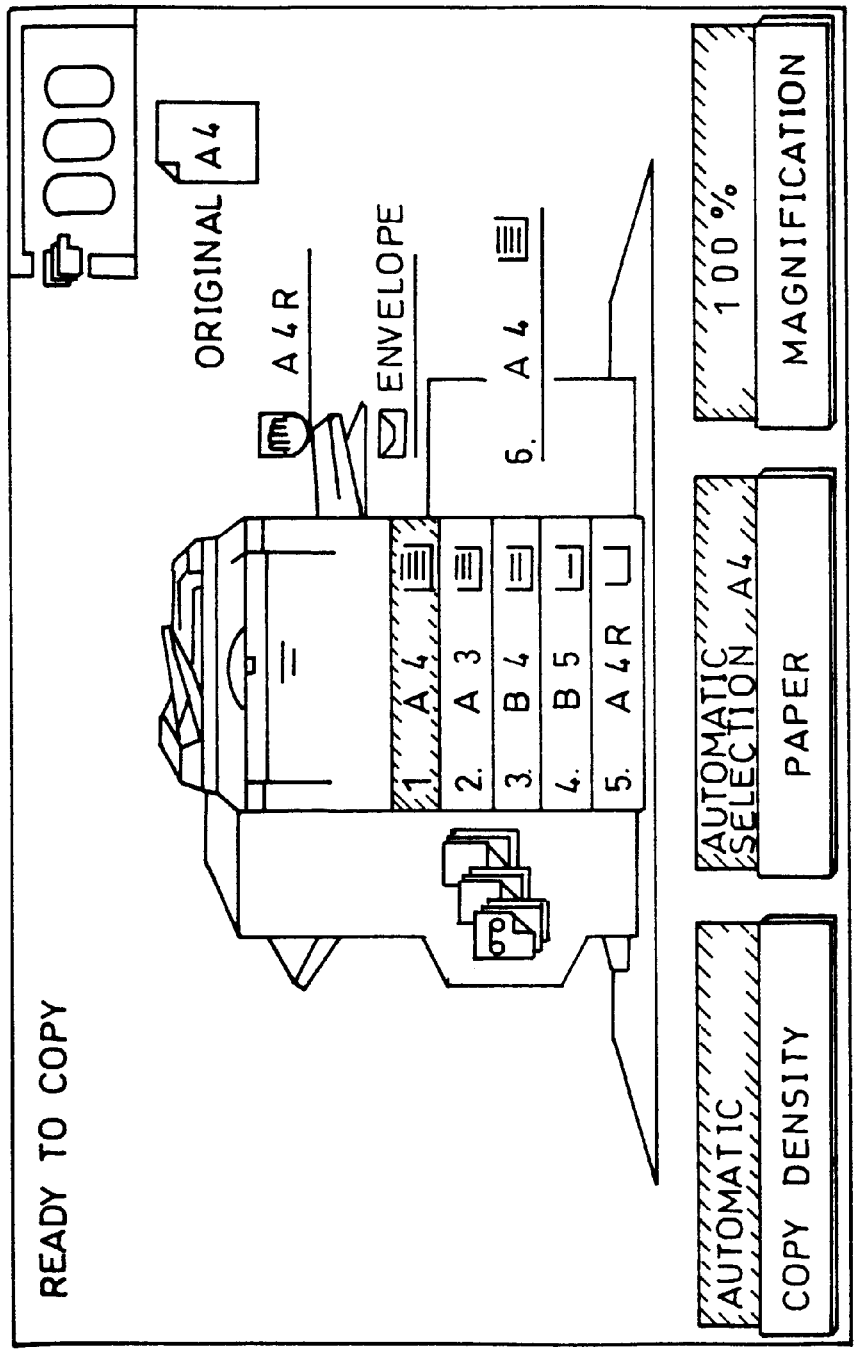
FIG. 14 is an explanatory view illustrating a display screen of the LCD section during output mode setting, in accordance with the embodiment of the present invention.

Then, upon completion of the setting of the output mode, the entire outward appearance illustration 702 of the digital copying machine 30 is restored, with the outward appearance illustration 712 of the post-processing device 34 and the icon 716, 717, or 718 indicating the set output mode being kept displayed on the LCD section 700, as shown in FIG. 14.

Incidentally, the foregoing description explains that the display state returns to a state in which the entire outward appearance illustration 702 of the digital copying machine 30 is restored with the icon 716, 717, or 718 being kept displayed, but depending on the output mode thus set, the state may simply return to the original display state in which only the entire outward appearance illustration 702 of the digital copying machine 30 is displayed while the icons 716, 717, and 718 are not displayed.

(Paper Selection Mode)

Subsequently, when the outward appearance illustration 725 of the feed devices 51 and 54 displayed in the right and lower parts of the outward appearance illustration 702 of the digital copying machine 30, displayed on the liquid touch panel 6, is operated, the screen shifts to a setting screen shown in FIG. 8 for selecting one from among the feed devices 51 and 54, i.e., a setting screen for selecting paper of a desired size from among those stored in the plurality of feed devices 51 and 54.

Figure 15:
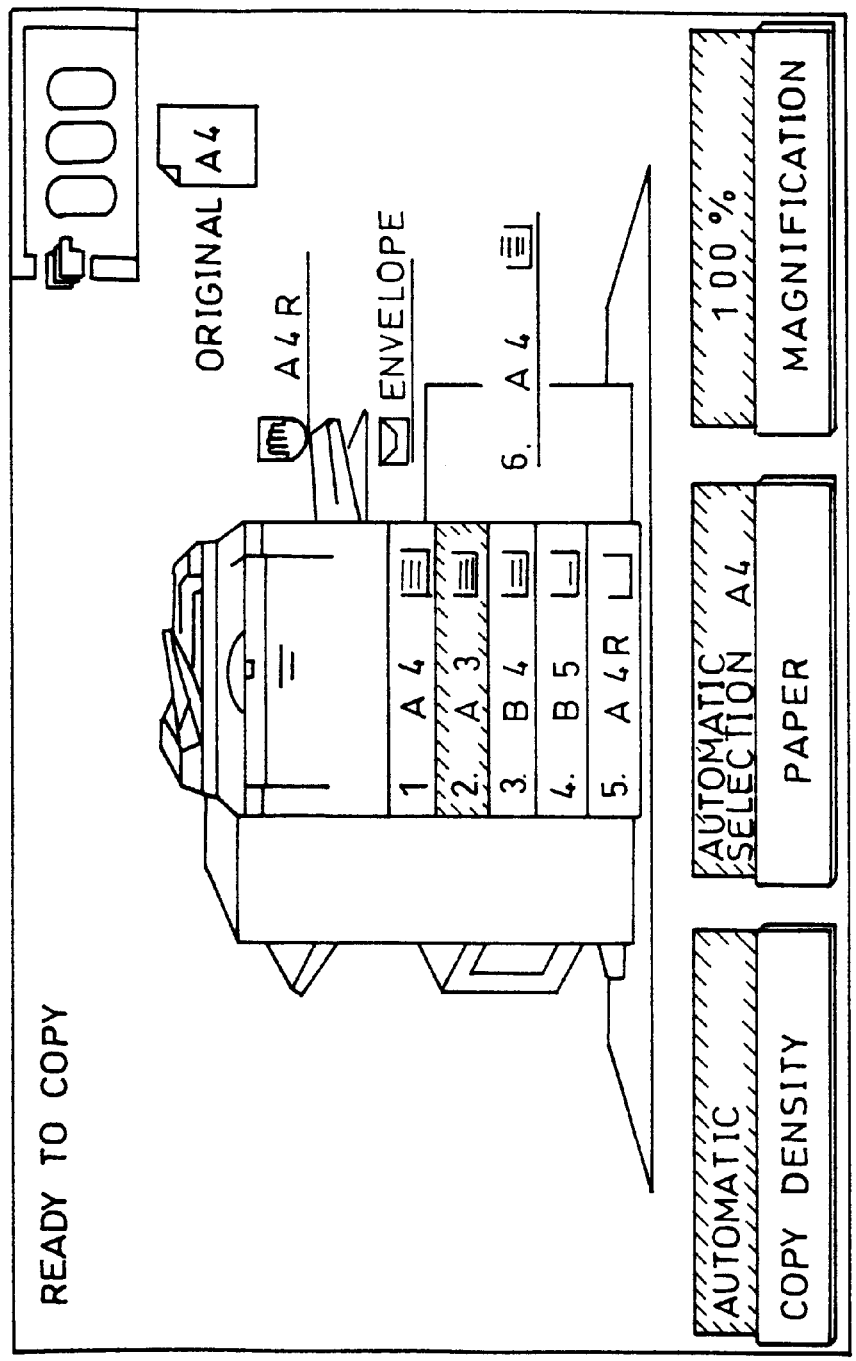
FIG. 15 is an explanatory view illustrating transition of the screen shown in FIG. 8.

The following description will explain screen shifting states of the LCD section 700 in order, while referring to FIGS. 5, 8, and 15.

When the liquid crystal touch panel 6 (see FIG. 5) on the operation panel 103 in a stand-by state is operated as described above, the screen shifts to the setting screen for the paper selection mode (see FIG. 8), and a plurality of feed device selecting keys (recording material selecting means) 720 are displayed on the center and right parts of the LCD section 700, in the same order as that in which the feed devices are arranged in the digital copying machine 30.

More specifically, the following keys are displayed as the feed device selecting keys 720: a feed device selecting key 720-1 for selecting a cassette feed device T1 for A4-size paper; a feed device selecting key 720-2 for selecting a cassette feed device T2 for A3-size paper; a feed device selecting key 720-3 for selecting a cassette feed device T3 for B4-size paper; a feed device selecting key 720-4 for selecting a cassette feed device T4 for B5-size paper; a feed device selecting key 720-5 for selecting a cassette feed device T5 for A4R-size paper; a feed device selecting key 720-6 for selecting a cassette feed device T6 for A4-size paper; a feed device selecting key 720-7 for selecting an envelope-use manual feed device 54; a feed device selecting key 720-8 for selecting a usual manual feed device 54.

Then, when the feed device selecting key indicating a feed device containing paper of a desired size, for example, the key 720-2 indicating the cassette feed device T2 for A3-size paper, is selected and operated from among the feed device selecting keys 720-1 to 720-8 thus displayed and the selection is fixed, the screen of the LCD section 700 is switched to a screen shown in FIG. 15, in which the display of the cassette feed device T2 containing the A3-size paper thus selected is reversed, so as to show that the cassette feed device T2 is ready to feed.

In the paper selection mode as well, as clear from FIGS. 8 through 15, the entire outward appearance illustration 702 of the digital copying machine 30, displayed in the vicinity of the center of the LCD section 700, is basically displayed at the same position in the same display form on the LCD section 700, when it is partly hidden behind the feed device selecting keys 720-1 to 720-8 as shown in FIG. 8 as well as when the whole illustration 702 reappears as shown in FIG. 15.

By operating the operation panel 103 of the digital copying machine 30 thus arranged as described above, an outputting operation of image information inputted thereto is carried out.

The following description will explain a display method whereby information regarding paper on which input images are to be recorded is displayed with use of respective initial screens of the operation panel 103 of the digital copying machine 30, in the respective image input modes.

The memory 102 of the operation panel board 100 which controls the operation panel 103 of the digital copying machine 30 stores and manages information such as size information of paper contained in the feed devices 51 and 54 in the feeding and transporting section 206 which is controlled by the sub CPU 201 of the machine control board 200.

The information thus stored and managed is not limited to the information regarding the feed devices 51 and 54, and size information of the paper contained in optional feed units additionally provided may be stored and managed as well. The memory 102 stores and manages information such as paper characteristics other than the paper size information, as a managing table.

Incidentally, "characteristics of paper" in the present specification are defined to mean information regarding types of paper other than the size information, that is, for example, paper material, presence/absence of logo marks, presence/absence of ruled lines, and color.

By using the stored information, the display states of information regarding paper contained in the feed devices 51 and 54, which are displayed on the LCD section 700 of the operation panel 103, are changed according to the image input mode for inputting image information.

Figure 16:
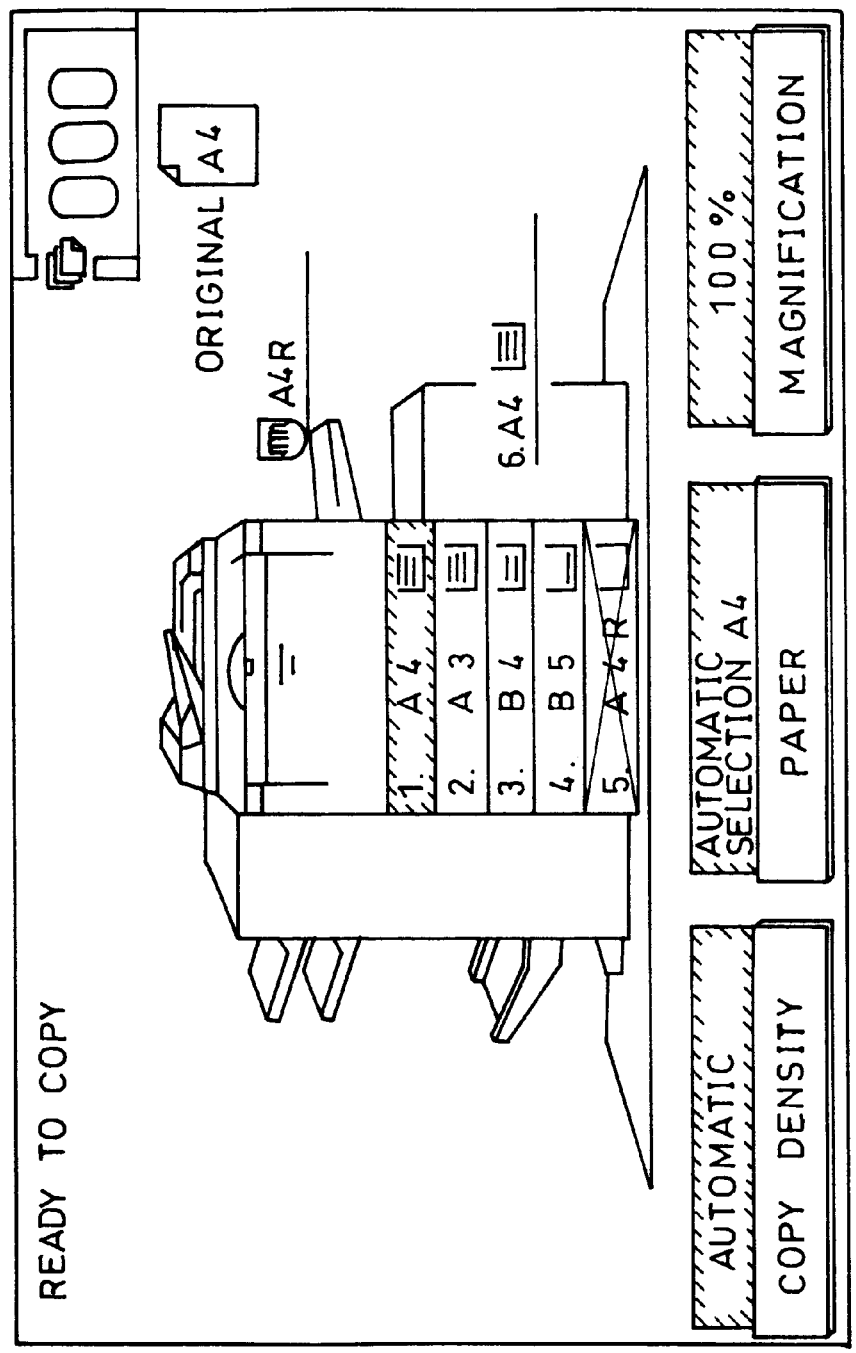
FIG. 16 is a view illustrating a display form of information regarding paper on an initial screen in a copy mode, in accordance with the embodiment of the present invention.
Figure 17:
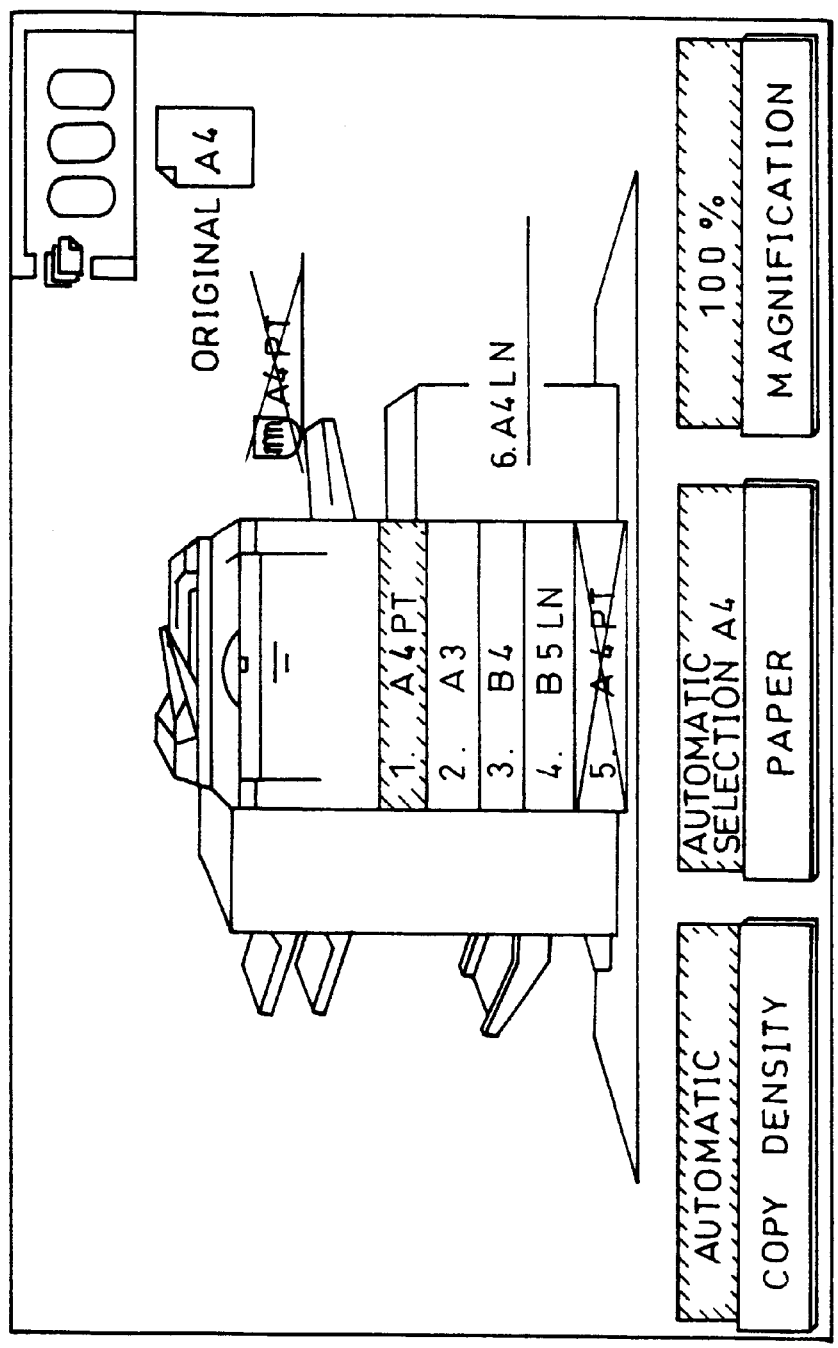
FIG. 17 is a view illustrating a display form of information regarding paper on an initial screen in a facsimile mode, in accordance with the embodiment of the present invention.
Figure 18:
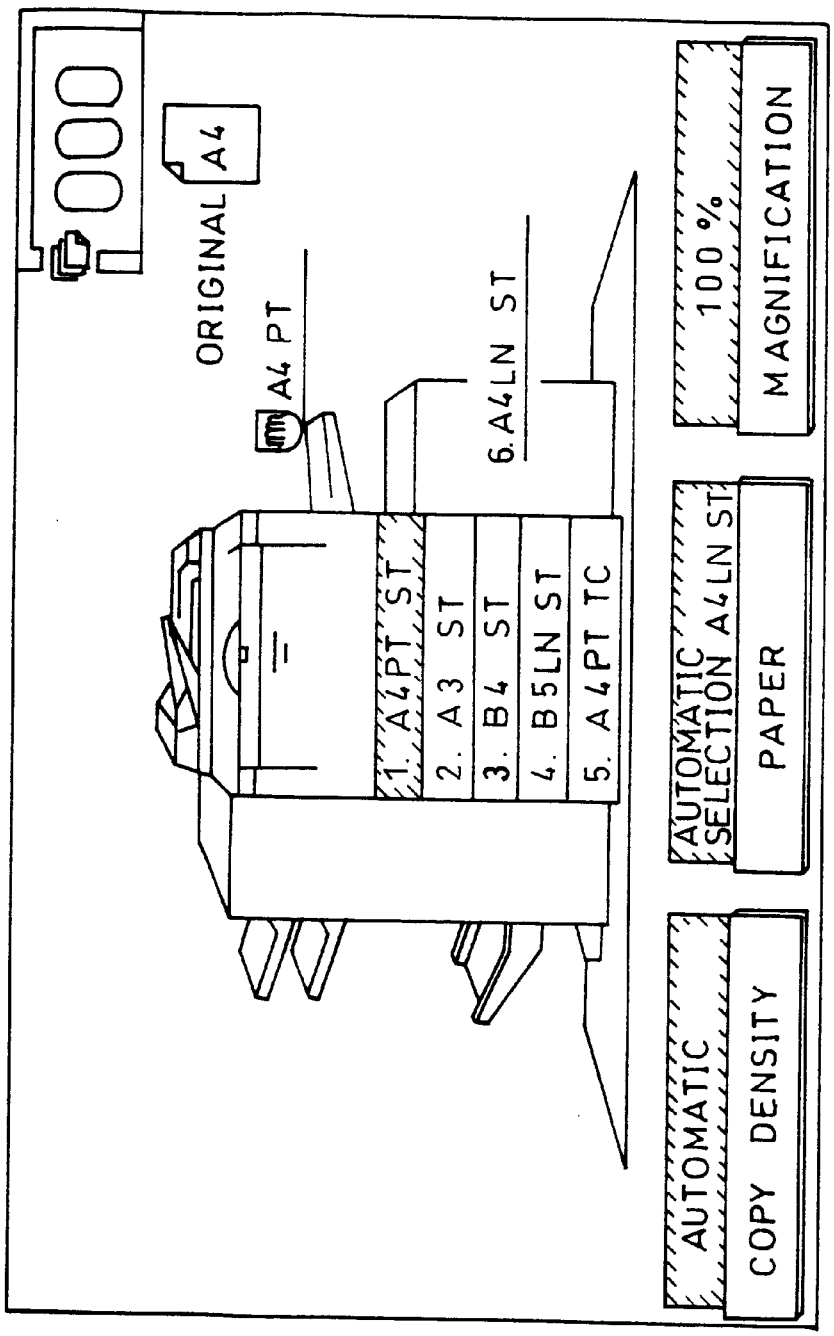
FIG. 18 is a view illustrating a display form of information regarding paper on an initial screen in a printer mode, in accordance with the embodiment of the present invention.
Figure 20:
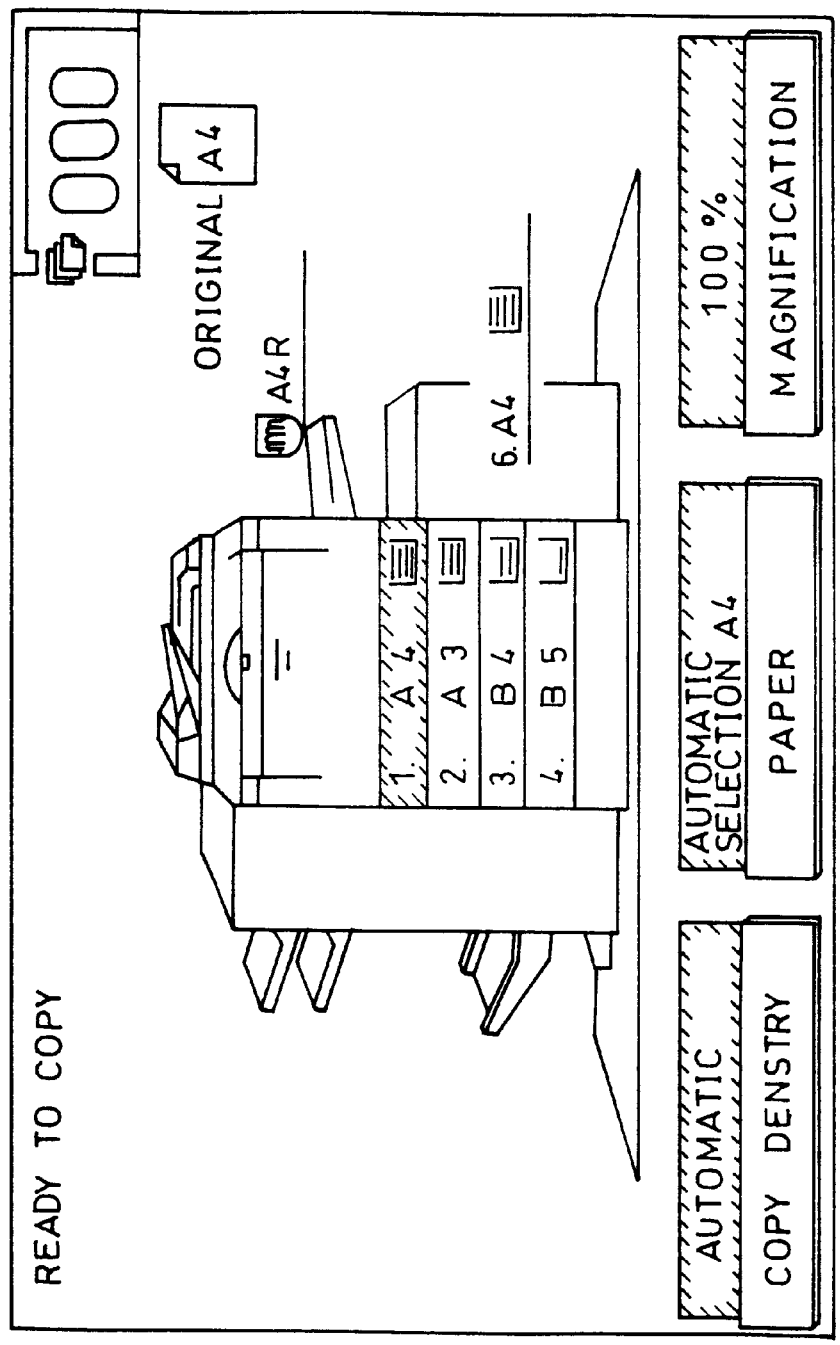
FIG. 20 is an explanatory view illustrating a display state on an initial screen during copy mode setting, in accordance with another embodiment of the present invention.
Figure 21:
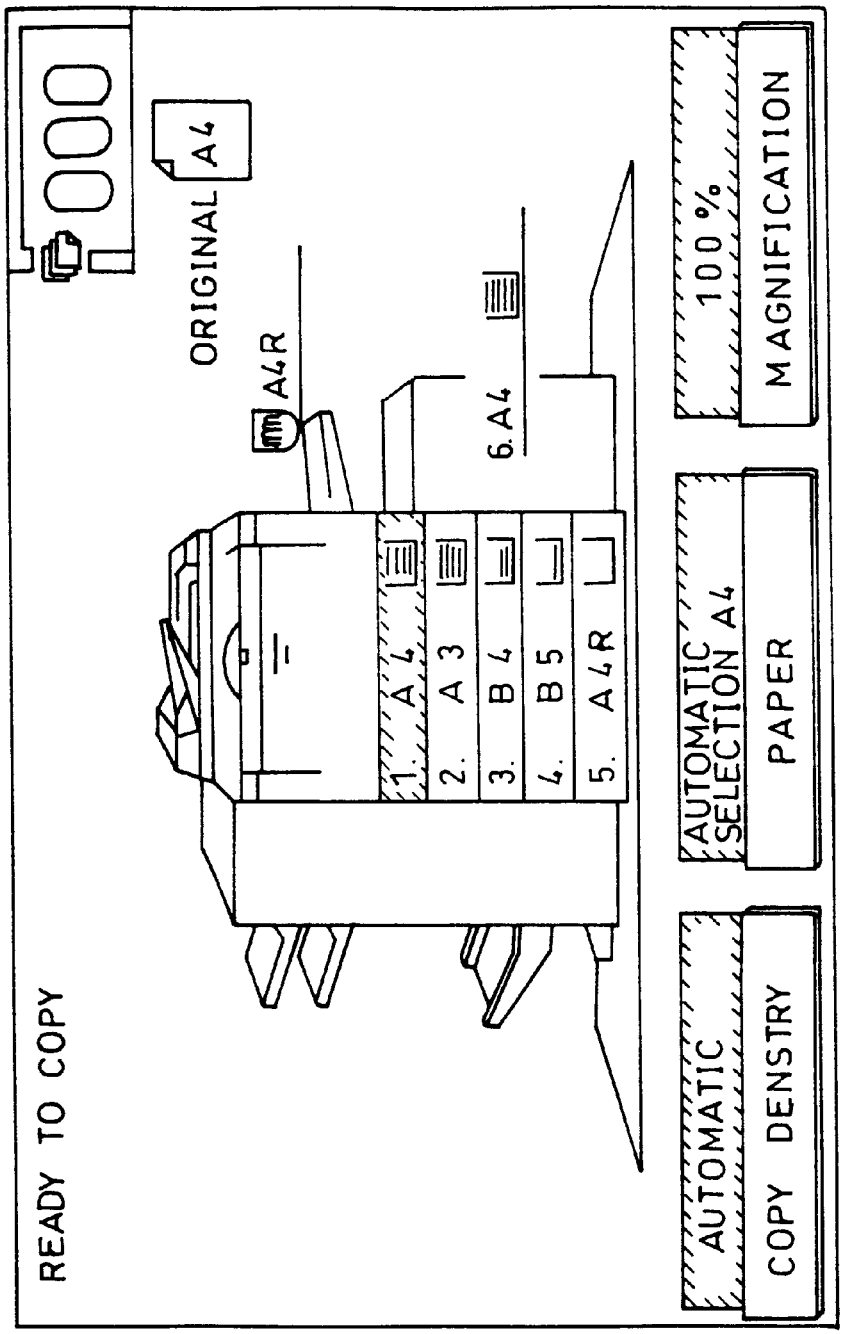
FIG. 21 is an explanatory view illustrating a display state on an initial screen during copy mode setting, in accordance with still another embodiment of the present invention.

Variations of the display states are shown in FIGS. 16 through 18. FIG. 16 illustrates a display state in the copy mode, FIG. 17 a display state in the facsimile mode, and FIG. 18 a display state in the printer mode.

In the copy mode, the paper size information and paper remain information are displayed as information regarding the paper contained in the feed devices 51 and 54. On the other hand, in the facsimile mode, the paper size information and paper orientation information (information regarding orientation of the paper) are displayed as information regarding the paper on which received images are recorded. Further, in the printer mode, the paper size information, the paper orientation information, and characteristics of paper (here, paper material information on whether the paper is plain paper or thick paper) are displayed as information regarding the paper on which image information designated so as to be outputted is recorded.

Incidentally, information regarding paper, which is displayed according to the image input mode, is managed by a managing section of the operation panel board 100, for example, a paper managing table (managing table means) 800 shown in FIG. 19. Information managed by the paper managing table 800 according to the image input mode is displayed on the liquid crystal touch panel 6 under control of the CPU 101.

FIG. 19 shows the paper managing table 800 in the case where the feeding and transporting section 206 is composed of seven types of feed devices including six types of cassette feed devices 51 (T1 through T6) and one type of a manual feed device 54 (indicated by a mark of manual feeding in the figure). The paper managing table 800 manages paper size information 801, paper orientation information 802 indicating orientation of paper, landscape or portrait, with respect to the paper transport direction, paper material information 803 regarding whether paper is plain paper or thick paper, and paper remain information 804 showing which level the quantity of remaining paper is at, among five integers 0 to 4 indicative of five levels respectively.

Incidentally, types of the information 801 to 804 shown herein are merely examples, and inch-based paper size information may be displayed as the paper size information 801. The paper material information 803 may be displayed with further detailed items including recycled paper, paper manufacturer, label sheet, and OHP sheet. Furthermore, depending on the method for detecting the remaining quantity of paper as well as the precision in detection, the paper remain information 804 may have further subdivided levels so as to indicate the remaining quantity of paper more precisely.

The information 801 to 804 regarding the feed devices 51 and 54 is previously set by using the setting screen of the liquid crystal touch panel 6 shown in FIG. 24, as described later, and there is no need to detect it by using a sensor. Alternatively, however, instead of manually setting the information 801 to 804, the information 801 to 804 may be detected automatically by a sensor.

For example, a paper material detecting sensor for detecting paper material information 803 and a remain detecting sensor for detecting paper remain information 804 may be provided on the cassette feed devices 51, and a paper size detecting sensor for detecting paper size information 801 may be provided on the manual feed devices 54.

In the example case herein shown, the manual feed devices 54 are arranged so that specific information on paper, such as paper material information 803 and paper remain information 804, is not detected and displayed. The reason is as follows: since paper in the manual feed devices 54 is easily replaced with different one whereby as a result various types of paper can be set therein, it is normally difficult to provide a function of automatically detecting material of paper whatever paper is set. Therefore, the manual feed devices 54 are here arranged so as not to manage information on characteristics of paper such as paper material.

Depending on the specification of the main body, however, it is possible to arrange the manual feed devices 54, like the cassette feed device 51, so that information on characteristics of paper such as paper material is detected and displayed.

Further, it is possible to combine the manual setting and the detection by sensor. Specifically, information 801 to 804 regarding the feed devices 51 and 54 may be arranged so that a part of the information is manually set while the rest is automatically detected. In concrete terms, for example, in the case where the paper material information 803 is information indicating whether the paper is OHP sheets, thick sheets, or standard (plain) sheets, information regarding whether it is standard or thick may be set manually, while information regarding whether it is OHP sheets or not may be detected automatically by a sensor (for example, a light transmittance sensor).

Furthermore, information (items) managed by the paper managing table 800 is not limited to those described herein, but the items to be managed may be altered or increased as required, with information on other characteristics of paper including color of paper, whether or not it is special paper such as paper with logo marks or paper with ruled lines, and the like.

Then, information on paper to be displayed on the LCD section 700 is selected and set out of these control items in accordance with the image input mode, i.e., any one of the copy mode, the printer mode, and the facsimile mode, and at every switch between the image input modes, the information on paper is displayed on the LCD section 700 according to the current image input mode under control of the sub CPU 101.

Incidentally, as described above, various schemes are available to change information displayed on the LCD section 700 depending on the image input mode, and one of them is a scheme of independently setting paper information according to the respective image input modes, i.e., the copy mode, the facsimile mode, and the printer mode, as shown in FIG. 19.

For example, in an embodiment shown in FIG. 19, an input mode display setting table (managing table means) 810 for determining which types of control information should be displayed depending on the image input mode, is provided so that the display settings are manipulated through the operation panel 103. For example, information is stored in the memories 403, 202, 102, and 502 and the like, and when the image input mode is changed during an operation, the display contents are switched in accordance with contents of the input mode display setting table 810 and the paper managing table 800.

In the case of the embodiment shown in FIG. 19, information display is arranged as follows. In the copy mode, the paper size information 801, the paper orientation information 802, and the paper remain information 804 is displayed (indicated by "o" in the figure), whereas the paper material information 803 is not displayed (indicated by "-" in the figure). On the other hand, in the facsimile mode, the paper size information 801 and the paper orientation information 802 is displayed, while the paper material information 803 and the paper remain information 804 is not displayed. In the printer mode, only the paper remain information 804 is not displayed, whereas the other information 801 to 803 is displayed.

The above description thus explains the foregoing embodiment in which the input mode display setting table 810 is independently provided so that displayed contents are switched, but the following arrangement may be applicable alternatively. Namely, different paper managing tables 800 are provided for the image input modes respectively and are stored in the memories 403, 202, 102, 502 and the like, so that in response to a switch of the image input mode, the paper managing tables 800 are switched accordingly, thereby changing the displayed contents as well.

In the case where it is ensured that an operator of the device or a caretaker of the device can freely set, depending on each image input mode, information in the paper managing table 800 for setting the control items to be displayed, it is possible to freely set, in accordance with the user's demands, display forms of paper information displayed on the LCD section 700 depending on the image input mode.

FIG. 24 illustrates a paper characteristics setting screen for setting information on paper stored in the feed devices 51 and 54 of the digital copying machine 30. The characteristics setting screen is displayed as a setting screen on the LCD section 700 of the operation panel 103, only when the device is shifted into an inspection mode (hereinafter referred to as simulation mode) in which a caretaker such as a serviceman is allowed to inspect the digital copying machine 30 so as to check states of usage and operations thereof.

Incidentally, to prevent a common user from viewing service information freely, the shift of the device to the simulation mode is usually conducted not by manipulating the keys on the operation panel 103 but only by manipulating keys (not shown) exclusively for this use in a specific order, the keys being provided anywhere other than the operation panel 103.

Besides, a tray selecting key group 821 for selecting one from among the feed devices 51 and 54 of the digital copying machine 30 is displayed in the left part of the LCD section 700, a size selecting key group 822 for setting paper size is provided in the center part of the screen, and a characteristic selecting key group 823 for setting paper characteristics is provided in the right part of the screen, with the keys being thus grouped. Further, below the key groups 821 to 823 in the screen of the LCD section 700, a confirmation key 824 for confirming the input through the key groups 821 to 823 is displayed.

On the screen of the LCD section 700, the transparent tablet 701 (see FIG. 5) is laminated, and key input (key manipulation) is carried out by the operator pressing portions of the tablet 701 at which the key groups 821 to 823 are displayed.

One of manipulating schemes is as follows. The operator presses one tray selecting key in the tray selecting key group 821 in the left part of the screen, whereby one (here, the trays 1, the tray 2, the tray 3, or the tray 4) is selected from among the feed devices 51 and 54. Subsequently, the operator sets a size (here, A3, A4, B4, B5, POSTCARD, or ENVELOP) of paper contained in the feed device 51 or 54 thus selected, through key manipulation of the size selecting key group 822, and a characteristic (here, OHP SHEET, THICK, THIN, or LOGO MARK) of the paper through key manipulation of the characteristic selecting key group 823. Thereafter, upon completion of the paper characteristics setting operation by manipulating the confirmation key 824, the setting contents are stored in the memories 102, 202, 403, 502, and the like.

The selection of characteristics of paper by use of the characteristics selecting key groups 823 is sometimes unnecessary. For example, in the case where paper is in a specific size such as in an envelope, postcard, or double postcard size, since such paper usually has one determined characteristic, a desired characteristic of paper is confirmed by selecting the size alone from among the paper size group. On the other hand, in the case where paper is in a regular size such as in an AB-type size or in an inch-based size, it is not necessarily plain paper, and it may have a specific characteristics; may be an OHP sheet, color paper, thick paper, thin paper, or logo-mark-typed paper. Therefore, in this case, the characteristic of paper is selected after the paper size is selected, and the operation is completed with manipulation of the confirmation key 824.

Incidentally, the information set regarding the feed devices 51 and 54 is stored, divided according to the feed devices 51 and 54, in the paper managing tables 800 which are provided in the memories (403, 202, 102, and 502), respectively. The stored information is used in selection from among the feed devices 51 and 54 in accordance with the image input mode of the digital copying machine 30.

Furthermore, the information 801 to 804 relating to paper can be set by use of the key groups 821 to 824 as the setting means, but if all the users are allowed to change the settings by use of the key groups 821 to 824, the users may get confused. Therefore, it is possible to provide such an arrangement that the user is required to input a password in the case where a specific type of paper is used or when a quantity of paper of a predetermined type has become small, so that a specific user is allowed to use the key groups 821 to 824. In this case, the password may be inputted through the numerical keys 15 or the like.

Furthermore, it is possible to provide such an arrangement that, depending on the image input mode, information on unsuitable paper, among the information 801 to 804 concerning paper managed by the paper managing table 800, is not displayed on the LCD section 700. To be more specific, for example, in the copy mode, in order that unsuitable paper (for example, thick paper) is unavailable for selection, the cassette T5 containing that paper may be made not displayed, as shown in the display state of FIG. 20.

Alternatively, unsuitable paper can be made unavailable for selection depending on the image input mode, by arranging the information 801 to 804 managed by the paper managing table 800. More specifically, for example, in the copy mode, selection of unsuitable paper (for example, thick paper) contained in the cassette feed device T5 for A4-portrait paper by use of the paper selecting key 8 can be made impossible, as shown in the display state of FIG. 16.

By thus displaying (controlling the display), such an inconvenience that the operator reproduces and records images on unsuitable paper in any one of the image input modes is surely avoided.

Furthermore, as another embodiment of the present invention, the feed devices 51 and 54 may be controlled in such a manner that display of suitable feed devices available for selection is controlled in accordance with the image input mode for image information input (here, the copy mode, the facsimile mode, and the printer mode) as shown in FIG. 22.

In this case, in concrete terms, for example, the operator or the caretaker may input contents of a managing table (managing table means) 820 by using the operation panel 103 so that the contents are stored in memory devices such as the memories 403, 202, 102, 502, and the like. The contents in the managing table 820 from the memory devices may be read out upon a switch of the image input modes, so as to be displayed on, for example, the LCD section 700 of the operation panel 103.

In other words, at a stage of setting the digital copying machine 30 or setting paper therein, a person who manages and knows what types of paper are contained in the feed devices 51 and 54 should previously set that information in the managing table 820, as information to be used as reference in selection and display.

Figure 23:
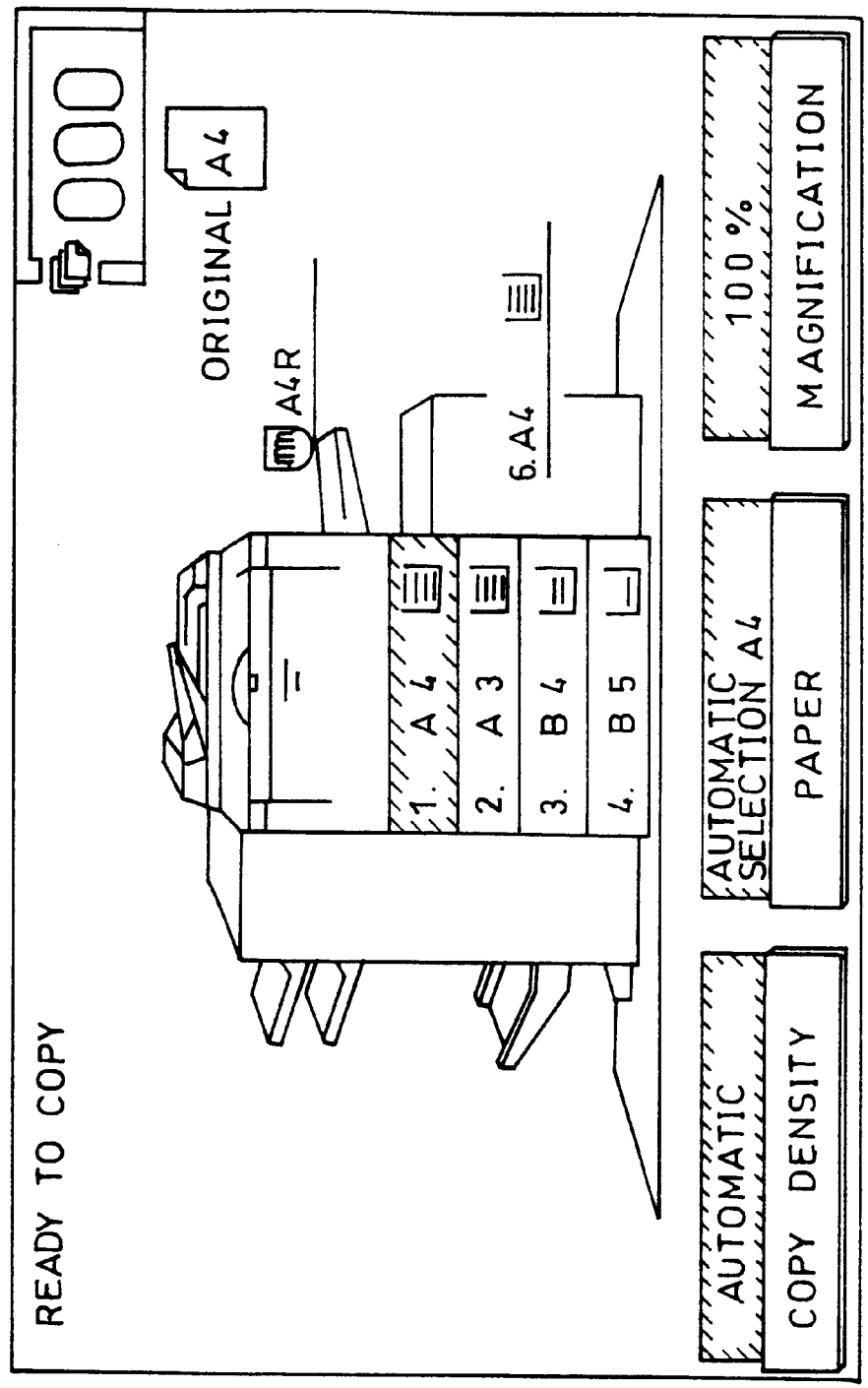
FIG. 23 is an explanatory view illustrating a display state of an initial screen on the basis of the managing table, in accordance with the embodiment of the present invention.

The managing table 820 thus arranged enables display of information regarding suitable ones of the feed devices 51 and 54 in a stand-by state for feeding, and display of information regarding paper contained in the feed devices 51 and 54, in accordance with the image input mode. The display state in this case is shown in FIG. 23.

Above described is the managing method of information regarding paper set in a stand-by state for feeding, in the plurality of the feed devices 51 and 54, and the display control method based on information on the paper.

Incidentally, usual image forming devices including the digital copying machine 30 of the present embodiment are arranged so that in response to input of image information, a feed device containing paper in a suitable size for the image information is automatically selected and paper is supplied from the selected feed device sheet by sheet, so that the image information is recorded on the paper.

The display control method (function) in accordance with the present invention is particularly effective, in the case where paper selection has to be carried out not in the automatic paper selection mode but in the manual paper selection mode in which the user is required to select (desirable) paper on which images are to be recorded, for example: in the case where paper (particularly paper size) has to be selected manually when suitable paper is not found by automatic paper selection; or in the case where a plurality of types of paper in the same size but with different materials are available.

Incidentally, the foregoing description on the present embodiment merely explains an embodiment of the present invention, and it is obvious that the invention may be varied in man y ways and such variations are not to be regarded as a departure from the spirit and scope of the invention.

In the embodiment described above as a mere example, the LCD section 700 is arranged so that the liquid crystal touch panel 6 as the recording material display means is integrally provided with the tablet 701 as the recording material selecting means. Therefore, contents of available operations (in this case, display contents) can be easily changed only by changing display data, ma naging tables and the like by use of software, and hence the embodiment is preferable as compared with a normal operation panel which requires keys and switches provided independent from a display section. However, a conventional panel having (i) a lighting section (display section) composed of light-emitting diodes or the like in combination with (ii) an operational section which is composed of keys and switches provided independent from the lighting section may be adapted so as to be used as the recording material display means and the recording material selecting means, so that a plurality of display contents are appropriately displayed in accordance with input contents.

Alternatively, a part of the structure of the present invention (control means or the like) may be substituted for by software. To be more specific, it is possible, for example, to use a personal computer, a scanner, a printer and the like connected with each other through network so as to constitute an image processing system. And this system is arranged so that a program for changing display contents on a display screen is stored in a predetermined recording medium, and that to execute the program, the personal computer is caused to read program in the recording medium. By so doing, the present invention can be embodied. In this case, the following effect as new effects can be achieved. Namely, the set-up data of the managing table and the like can be easily altered by modifying and updating software by operations on the personal computer, and the set-up data of the managing table and the like can be easily copied and distributed in the case where a plurality of systems exist.

Furthermore, the foregoing description explained the embodiment in which the present invention is applied to a digital copying machine having the copy function, the facsimile function, and the printer function altogether. Needless to say, however, it is possible that a part or the whole of the scanner section 31, the laser recording section 32, the feed devices 51 and 54, the postprocessing device 34, and the image processing section (the main image processing board 400 and the sub image processing board 500) may be provided in separate devices and are connected with each other, so as to realize the present invention. In this case, in addition to the effects of the present invention, the following new effects can be expected. Namely, mobility is improved by taking the module form, and in the case where a plurality of systems exist, a total cost can be lowered by omitting duplicating parts.

Furthermore, the laser recording section 32 which is a printer in the electrophotographic system is used as recording means, but a printer in another image forming system may be used as recording means.

As described above, the digital copying machine 30 of the present invention is a composite machine providing three image input modes of the copy mode, the facsimile mode, and the printer mode, and the machine is arranged so that whenever the image input mode is newly set, information regarding paper to be displayed on the LCD section 700 of the operation panel 103 is displayed in an appropriate form and that depending on the image input mode, a part of the feed devices 51 and 54 cannot be selected. Therefore, it is possible to ascertain what types of paper are stored in the feed devices 51 and 54, and which is, depending on the image input mode, unsuitable for recording images in that image input mode.

In the case where the digital copying machine 30 is used as printer, special types of paper with various characteristics, such as thick paper, envelopes, or format paper, as well as plain paper are set in the feed devices 51 and 54. By the foregoing control, such a trouble as that images are erroneously recorded on special types of paper in other input mode than the printer mode can be avoided. In other words, for example, a trouble that images are recorded on paper other than plain paper in the facsimile mode, and a trouble that in the copy mode, images are recorded on special types of paper which are unsuitable for the copy mode (for example, thick paper or format paper), can be avoided.

Furthermore, as described above, the digital copying machine 30 of the present invention is a digital composite machine including as a plurality of image input means for inputting image information in different forms, the printer board (external image input means) 601, the function extension board (original image input means) 602, and the FAX board (facsimile image input means) 603, and the machine has the printer mode in which the printer board 601 is used, the copy mode in which the function extension board 602 is used, and the facsimile mode in which the FAX board 603 is used. The digital copying machine 30 is equipped with: the feed devices 51 and 54 for supplying paper of a plurality of types; the LCD section 700 for displaying information (size, material, presence/absence of ruled lines, presence/absence of logo marks, etc.) regarding paper which is ready to be fed from the feed devices 51 and 54; the mode keys 20 to 22 for selecting one mode from among the printer mode, the copy mode and the facsimile mode; the feed device selecting keys 718 for selecting recording material on which image information is recorded from among the types of paper displayed on the LCD 700; the laser recording section 32 for recording image information inputted in the mode selected through the mode keys 20 to 22 onto paper selected by the feed device selecting keys 718; and the CPU 101 for determining information regarding paper to be displayed on the LCD section 700 depending on the mode selected.

Therefore, the machine conducts display of information regarding paper in an appropriate state, thereby being capable of surely conveying information regarding paper to the user. This allows the user who has confirmed the information regarding paper thus displayed on the LCD section 700 to ascertain which types of paper are in the stand-by state for supply, and hence to form images on desired paper selected therefrom. As a result, the following effect can be achieved. Namely, such an error that paper unsuitable for recording is selected and images are recorded thereon can be avoided.

Furthermore, as described above, the digital copying machine 30 of the present invention is arranged so that only information regarding paper suitable for the recording of image information inputted is determined as information to be displayed on the LCD section 700, and that information regarding paper unsuitable for the recording is not displayed. Therefore, though various types of paper are set in the feed devices 51 and 54 in the stand-by state for feeding, unsuitable paper is by no means selected, and such an effect can be achieved that an error of selecting unsuitable paper and recording images thereon can be avoided.

Furthermore, as described above, in the digital copying machine 30 of the present invention, the selection of paper by use of the feed device selecting keys 718 is arranged so that only selection of recording materials suitable for the recording of the image information inputted is allowed. This makes it possible to ascertain what types of paper are set in the feed devices 51 and 54. Further, in the case where various types of paper are set in the feed devices in the standby state for feeding, they are viewed on the display, but unsuitable ones are by no means selected. As a result, such an effect can be achieved that an error of selecting unsuitable paper and recording images thereon can be avoided.

Furthermore, as described above, since the digital copying machine 30 of the present invention is equipped with the key groups 821 to 824 for setting display information regarding paper determined by the CPU 101, the operator or the caretaker is allowed to set display contents appropriately as required. Therefore, such an effect can be achieved that an error of selecting unsuitable paper and recording images thereon can be avoided.

Furthermore, as described above, the digital copying machine 30 of the present invention is equipped with the tables 800, 810, and 820 for controlling information regarding paper in the feed devices 51 and 54, and the CPU 101 determines display information based on the control information of the tables 800, 810, and 820. Therefore, an appropriate display scheme as well as appropriate display of information is ensured on the basis of information regarding paper which is collectively controlled altogether. As a result, in the case where various types of paper with various characteristics are set in the feed devices 51 and 54 in the stand-by state for feeding, which type of paper is appropriate can be confirmed by seeing the display screen and hence appropriate paper is selected. Accordingly, such an effect can be achieved that an error of selecting unsuitable paper and recording images thereon can be avoided.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image forming device, comprising:

a plurality of image input means for inputting image information, said image input means inputting image information in different forms, respectively;

recording material supply means for supplying recording materials of a plurality of types;

recording material information display means for displaying information regarding recording materials which are ready to be fed from said recording material supply means;

input selecting means for selecting one image input means from among said plural image input means;

recording material selecting means for selecting one recording material on which image information is to be recorded, from among the recording materials the information of which is displayed by said recording material information display means;

recording means for recording image information inputted by said image input means selected, onto the recording material selected by said recording material selecting means; and control means for determining information regarding the recording materials to be displayed by said recording material information display means, depending on the image input means selected.

2. The image forming device as set forth in claim 1, wherein the control means determines information to be displayed so that only the information regarding the recording materials suitable for recording image information inputted is displayed by said recording material information display means.

3. The image forming device as set forth in claim 1, wherein said control means controls said recording material selecting means so that only the recording materials suitable for recording the image information inputted are available for selection.

4. The image forming device as set forth in claim 1, further comprising setting means for setting information regarding the recording materials to be displayed by said recording material information display means, wherein said control means determines information to be displayed, based on the settings by said setting means.

5. The image forming device as set forth in claim 1, further comprising managing table means for managing the information regarding the recording materials to be displayed by said recording material information display means, wherein said control means determines information to be displayed, based on the information managed by said managing table means.

6. The image forming device as set forth in claim 1, wherein said image input means includes:

facsimile image input means for inputting image information transmitted from an external facsimile machine which is connected through communication lines;

original image input means for inputting information regarding original images which have been read by image reading means; and external image input means for inputting image information supplied from an external image information processing device.

7. The image forming device as set forth in claim 1, wherein said control means controls said recording material selecting means so that, depending on the image input means selected, only recording materials with characteristics suitable for that image input mode are available for selection.

8. The image forming device as set forth in claim 1, further comprising setting means for previously setting recording material supply sections for supplying recording materials that can be selected for each of the image input modes.

9. An image forming device, which is functional in a plurality of image input modes in which image information is inputted in different forms, respectively, said device comprising:

input selecting means for selecting one image input mode from among the plural image input modes;

recording material supply means for supplying recording materials of a plurality of types for recording image information;

recording material selecting means for selecting a recording material to be supplied by said recording material supply means;

recording means for recording image information inputted in the image input mode selected by said input selecting means, onto the recording material selected by said recording material selecting means; and control means for controlling said recording material selecting means so that only recording materials suitable for the image input mode selected are available for selection.

10. The image forming device as set forth in claim 9, wherein the image input modes include:

a facsimile mode for inputting image information transmitted from an external facsimile machine which is connected thereto through communication lines;

a copy mode for inputting information of original image which has been read by image reading means; and a printer mode for inputting image information supplied from an external image information processing device.

11. The image forming device as set forth in claim 9, wherein said control means controls said recording material selecting means so that only recording materials with characteristics suitable for the image input mode are available for selection.

12. The image forming device as set forth in claim 9, further comprising setting means for previously setting recording material supply sections for supplying recording materials that can be selected for each of the image input modes.

* * * * *